(12) United States Patent
Criminale et al.

(10) Patent No.: US 12,166,366 B2
(45) Date of Patent: *Dec. 10, 2024

(54) SUBSTRATE ENCLOSURE SYSTEM WITH ASSEMBLY FOR CHARGING A VALIDATION WAFER

(71) Applicant: Applied Materials, Inc., Santa Clara, CA (US)

(72) Inventors: Phillip Alfred Criminale, Liberty Hill, TX (US); Zhiqiang Guo, San Jose, CA (US); Andrew S. C. Ho, Liberty Hill, TX (US); Rachel Sara Stolzman, Saratoga, CA (US); Michael Carl Hankes, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,750

(22) Filed: Sep. 27, 2023

(65) Prior Publication Data

US 2024/0022083 A1 Jan. 18, 2024

Related U.S. Application Data

(63) Continuation of application No. 17/685,112, filed on Mar. 2, 2022, now Pat. No. 11,817,724.

(51) Int. Cl.
*H01M 10/44* (2006.01)
*H01M 10/46* (2006.01)
*H02J 7/00* (2006.01)

(52) U.S. Cl.
CPC ........ *H02J 7/00034* (2020.01); *H02J 7/0044* (2013.01)

(58) Field of Classification Search
CPC .... H02J 7/0044; H02J 7/00034; H02J 7/0042; H02J 50/10; H02J 50/005
USPC .......................... 320/107, 108, 114, 115, 132
See application file for complete search history.

(56) References Cited

U.S. PATENT DOCUMENTS

| | | | |
|---|---|---|---|
| 9,356,822 B2 | 5/2016 | Jensen | |
| 11,817,724 B2 * | 11/2023 | Criminale | ............. H02J 7/0044 |
| 2009/0101792 A1 | 4/2009 | Bonciolini et al. | |
| 2017/0113355 A1 | 4/2017 | Genetti et al. | |
| 2018/0019142 A1 | 1/2018 | Wong et al. | |

(Continued)

FOREIGN PATENT DOCUMENTS

| | | |
|---|---|---|
| KR | 10-2016-0141245 A | 12/2016 |
| KR | 10-2020-0072689 A | 6/2020 |

OTHER PUBLICATIONS

International Search Report and Written Opinion for the International Application No. PCT/US2022/052896, mailed on May 1, 2023, 9 pages.

(Continued)

*Primary Examiner* — Edward Tso
(74) *Attorney, Agent, or Firm* — LOWENSTEIN SANDLER LLP

(57) ABSTRACT

A system includes an enclosure configured to couple to an equipment front end module (EFEM) of a substrate processing system, a charging assembly, and one or more support structures within the enclosure. The one or more support structures are configured to support a validation wafer in a charging position to charge the validation wafer via the charging assembly.

20 Claims, 8 Drawing Sheets

(56) References Cited

U.S. PATENT DOCUMENTS

| | | |
|---|---|---|
| 2018/0048169 A1 | 2/2018 | Bello et al. |
| 2020/0324410 A1 | 10/2020 | Bergantz et al. |
| 2020/0335368 A1 | 10/2020 | Pan et al. |
| 2020/0373190 A1 | 11/2020 | Lee et al. |
| 2021/0098276 A1 | 4/2021 | Moura et al. |
| 2021/0257234 A1 | 8/2021 | Akiduki |
| 2021/0296149 A1 | 9/2021 | Green et al. |
| 2022/0086364 A1 | 3/2022 | Ummethala et al. |

OTHER PUBLICATIONS

InnerSense, A KLA Company, Wafer Handling Monitor, https://www.innersense-semi.com/wafer-handling-monitor, Downloaded Jan. 7, 2022, 2 pages.

\* cited by examiner

SUBSTRATE ENCLOSURE SYSTEM WITH ASSEMBLY FOR CHARGING A VALIDATION WAFER

RELATED APPLICATIONS

This application claims priority to and is a continuation of U.S. Non-provisional patent application Ser. No. 17/685,112, filed on Mar. 2, 2022, the contents of which is incorporated by reference in its entirety.

TECHNICAL FIELD

Embodiments of the present disclosure relate to enclosure systems, such as those used in association with substrate processing systems, and in particular to an enclosure system that has a charging assembly.

BACKGROUND

In substrate processing and other electronics processing, platforms are often used that use robotic arms to transport objects, such as substrates, between processing chambers, from storage areas (e.g., front opening unified pods (FOUPs)) to processing chambers, from processing chambers to storage areas, and so on.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, an enclosure system includes multiple walls forming an interior volume. The enclosure system is configured to couple to an equipment front end module (EFEM) of a substrate processing system. The enclosure system further includes a charging assembly including a first charging coil. The enclosure system further includes one or more first support structures disposed within the interior volume under the first charging coil. The one or more first support structures are configured to support a first validation wafer within a threshold distance of the first charging coil to charge the first validation wafer via the charging assembly.

In another aspect of the disclosure, a charging assembly of an enclosure system configured to couple to an EFEM of a substrate processing system includes a first charging coil to be disposed above one or more first support structures that support a first validation wafer within a threshold distance of the first charging coil within an interior volume of the enclosure system. The first validation wafer is to be positioned by the one or more first support structures to align a first charging interface of the first validation wafer with the first charging coil. The charging assembly further includes a rechargeable battery configured to charge the first validation wafer via the first charging coil. The rechargeable battery is configured to be recharged while coupled to the enclosure system.

In another aspect of the disclosure, a method includes receiving a first subset of sensor data from a validation wafer configured to be transferred by a robot of an EFEM of a substrate processing system from one or more support structurers disposed in an interior volume formed by an enclosure system. The first subset is associated with at least a charge state of an electrical storage device of the validation wafer. The method further includes receiving a second subset of the sensor data from a charging assembly of the enclosure system. The charging assembly is configured to charge the validation wafer responsive to the validation wafer being disposed on the one or more support structures. The method further includes causing, based on the sensor data, performance of a corrective action associated with the substrate processing system.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1A:
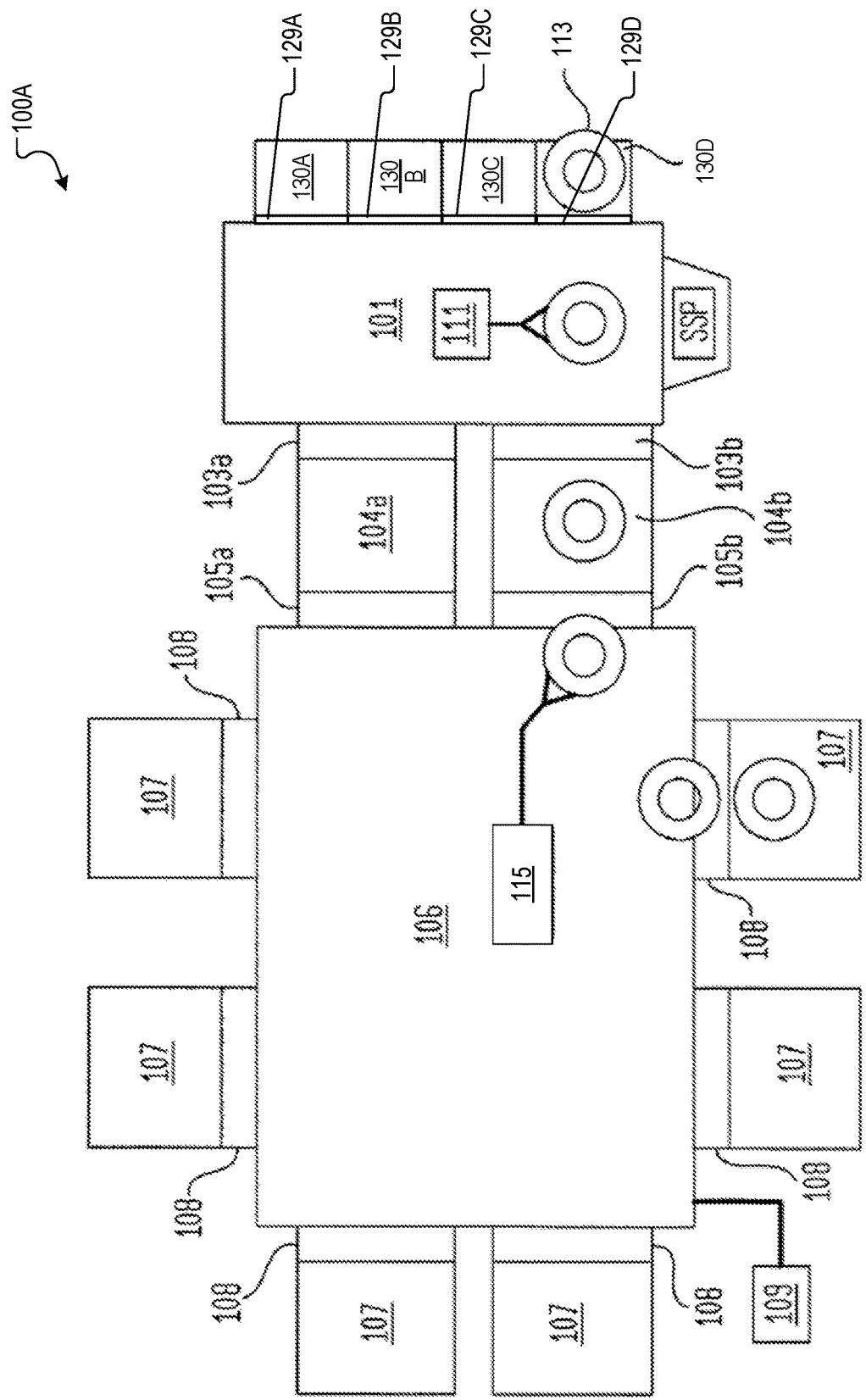
FIG. 1A illustrates a processing system, according to certain embodiments.

Embodiments described herein are related to an enclosure system that includes a charging assembly (e.g., FOUP for validation wafer charging and host communication).

Substrate processing systems are used to process substrates. The substrate processing system includes a factory interface (also known as an equipment front end module (EFEM)), load lock, transfer chamber, and processing chambers. A substrate storage system (e.g., FOUP) is coupled (e.g., docked via a load port) to the factory interface, a factory interface robot transports substrates from the substrate storage system (through the factory interface) to the load lock, a transfer chamber robot transports substrates from the load lock (through the transfer chamber) to the processing chambers to be processed. Then, the processed substrate is transported by the transfer chamber robot to the load lock and by the factory interface robot from the load lock to the substrate storage system. The factory interface maintains a first environment (e.g., atmospheric environment, inert environment, etc.) and the transfer chamber maintains a second environment (e.g., vacuum environment) to avoid contaminating the substrates and the substrate processing system.

Components of the substrate processing system become worn over time and are to be removed and replaced. For example, process kit rings are disposed in the processing chambers and become worn over time due to substrate processing operations and are to be replaced.

Conventionally, substrate processing systems (e.g., transfer chamber, processing chamber, etc.) are opened for inspection of the substrate processing system and for replacement of components (e.g., process kit rings). This causes the substrate processing systems to become contaminated and results in re-commissioning processes that keep the substrate processing system off-line which decreases yield, uses energy, and consumes operator time.

The devices, systems, and methods disclosed herein provide an enclosure system that solves problems of conventional systems. The enclosure system may be a FOUP that is configured to store and transport objects, such as carriers, processing kit rings, substrates, validation wafers, and/or the like. Each carrier may support one or more process kit rings. Additionally, the enclosure system may be configured to charge a validation wafer and/or receive sensor data from the validation wafer.

The enclosure system includes walls that form an interior volume. The walls may include sidewalls, a lower wall, an upper wall, and/or an enclosure door. The enclosure system (e.g., via one or more of the walls) is configured to couple to an EFEM (e.g., by the enclosure system being disposed on a load port). In some embodiments, an upper wall of the enclosure system is an enclosure lid that removably attaches to one or more of the sidewalls to at least partially enclose the interior volume of the enclosure system. In some embodiments, an enclosure door of the enclosure system removably attaches to one or more of the sidewalls. In some embodiments, the enclosure system (e.g., enclosure door, walls, enclosure lid, etc.) provide a sealed environment in the interior volume of the enclosure system.

In some embodiments, a validation wafer is to be stored in the interior volume of the enclosure system. The validation wafer includes one or more sensors (e.g., imaging sensor, pressure sensor, temperature sensor, etc.). The validation wafer is to be transferred from the enclosure system to one or more other parts of the substrate processing system to provide sensor data associated with the substrate processing system. In some embodiments, the validation wafer is transferred to a processing chamber to collect image data and/or other data to determine whether a process kit ring is to be replaced.

In some embodiments, the enclosure system includes a charging assembly. The charging assembly is configured to charge a validation wafer disposed in the enclosure system. In some embodiments, the charging system includes a charging coil. The charging coil may be configured to charge a validation wafer by inductive charging.

In some embodiments, the enclosure system includes one or more support structures disposed within the interior volume to support one or more objects (e.g., carriers, validation wafers, process kit rings, etc.) in the enclosure system. One or more first support structures are disposed under the charging coil and are configured to support a validation wafer within the interior volume of the enclosure system to charge the validation wafer via the charging assembly. In some embodiments, the one or more first support structures are configured to support the validation wafer within a threshold distance of the charging coil to charge (e.g., via inductive charging) the validation wafer via the charging assembly. In some embodiments, the one or more first support structures are configured to position the validation wafer to align a charging interface of the validation wafer with the charging coil.

In some embodiments, sensor data is received from the validation wafer and/or the enclosure system and a corrective action is performed based on the sensor data. For example, responsive to receiving the sensor data (e.g., images) associated with a process kit ring in a processing chamber, a corrective action may be performed of causing the process kit ring to be replaced with a new process kit ring from the enclosure system.

The devices, systems, and methods disclosed herein have advantages over conventional solutions. The present disclosure provides a validation wafer to inspect components (e.g., processing chamber, etc.) of the substrate processing system to provide sensor data associated with the components without opening the sealed environments (e.g., without opening the transfer chamber, without opening the processing chamber) compared to conventional systems where the sealed environments are opened to inspect the components. This allows the present disclosure to have increased yield, less energy usage, less contamination, and using of less operator time compared to conventional systems. The enclosure system of the present disclosure also provides for the transferring of sensor data from the validation wafer and/or enclosure system without opening the enclosure system or removing the validation wafer from the enclosure system, compared to conventional systems where the substrate processing system is opened to be inspected. This allows the present disclosure to have less contamination of the enclosure system and avoids lengthy decontamination processes. The enclosure system of the present disclosure also provides for charging of the validation wafer without opening the enclosure system or removing the validation wafer from the enclosure system. The enclosure system of the present disclosure also provides for replacing components (e.g., process kit rings) of the substrate processing system without opening the sealed environments and without time and energy intensive re-commissioning processes of conventional systems. Using the enclosure system of the present disclosure, a maintenance operation (e.g., replacement of a process kit ring in a processing chamber) can take place subsequent to an inspection (e.g., by the validation wafer) without human intervention, leading to more efficient maintenance of a processing chamber compared to conventional systems.

Although portions of the present disclosure refer to process kit rings and carriers, and validation wafers, the present disclosure can be applied to different types of content (e.g., other components of the substrate processing system, etc.). Although portions of the present disclosure refer to substrate processing systems, the present disclosure can be applied to other types of systems (e.g., other manufacturing systems, etc.). Although portions of the present disclosure refer to the enclosure system being a FOUP, the enclosure system of the present disclosure can be a side storage pod (SSP), or other type of enclosure (e.g., other enclosure of the substrate processing system, etc.).

FIG. 1A illustrates a processing system 100A (e.g., substrate processing system, wafer processing system, semiconductor processing system) according to certain embodiments. The processing system 100A includes a factory interface 101 (also known as an EFEM) and load ports 129 (e.g., load ports 129A-D). In some embodiments, the load ports 129A-D are directly mounted to (e.g., seal against) the factory interface 101. Enclosure systems 130 (e.g., cassette, FOUP, process kit enclosure system, or the like) are configured to removably couple (e.g., dock) to the load ports 129A-D. Referring to FIG. 1A, enclosure system 130A is coupled to load port 129A, enclosure system 130B is coupled to load port 129B, enclosure system 130C is coupled to load port 129C, and enclosure system 130D is coupled to load port 129D. In some embodiments, one or more enclosure systems 130 are coupled to the load ports 129 for transferring substrates and/or other substrates into and out of the processing system 100A. Each of the enclosure systems 130 seals against a respective load port 129. In some embodiments, a first enclosure system 130A is docked to a load port 129A (e.g., for replacing used process kit rings and/or for charging and/or storing a validation wafer). Once such operation or operations are performed, the first enclosure system 130A is then undocked from the load port 129A, and then a second enclosure system 130 (e.g., a FOUP containing substrates) is docked to the same load port 129A. In some embodiments, the first enclosure system 130A is semi-permanently docked to load port 129A. In certain embodiments, the first enclosure system 130A is integral with factory interface 101. In some embodiments, an enclosure system 130 (e.g., enclosure system 130A) is an enclosure system with support structures for aligning carriers, process kit rings, and/or validation wafers.

In some embodiments, a load port 129 includes a front interface that forms a vertical opening (or a substantially vertical opening). The load port 129 additionally includes a horizontal surface for supporting an enclosure system 130 (e.g., cassette, process kit enclosure system). Each enclosure system 130 (e.g., FOUP of substrates, process kit enclosure system) has a front interface that forms a vertical opening. The front interface of the enclosure system 130 is sized to interface with (e.g., seal to) the front interface of the load port 129 (e.g., the vertical opening of the enclosure system 130 is approximately the same size as the vertical opening of the load port 129). The enclosure system 130 is placed on the horizontal surface of the load port 129 and the vertical opening of the enclosure system 130 aligns with the vertical opening of the load port 129. The front interface of the enclosure system 130 interconnects with (e.g., clamp to, be secured to, be sealed to) the front interface of the load port 129. A bottom plate (e.g., base plate) of the enclosure system 130 has features (e.g., load features, such as recesses or receptacles, that engage with load port kinematic pin features, a load port feature for pin clearance, and/or an enclosure system docking tray latch clamping feature) that engage with the horizontal surface of the load port 129. The same load ports 129 that are used for different types of enclosure systems 130 (e.g., process kit enclosure system, cassettes that contain substrates, etc.).

In some embodiments, enclosure system 130 includes one or more shelves for aligning carriers, process kit rings, and/or validation wafers. In some embodiments, enclosure system 130 includes a pair of shelves for aligning a carrier and/or content (e.g., process kit ring, processing chamber component, validation wafer, etc.) disposed on the carrier. In some embodiments, enclosure system 130 includes two pairs of shelves, three pairs of shelves, four pairs of shelves, five pairs of shelves, six pairs of shelves, seven pairs of shelves, eight pairs of shelves, and/or the like for aligning objects (e.g., carriers, process kit rings, validation wafers, etc.).

In some embodiments, the enclosure system 130 (e.g., process kit enclosure system) includes one or more items of content 113 (e.g., one or more of a process kit ring, an empty process kit ring carrier, a process kit ring disposed on a process kit ring carrier, a validation wafer, etc.). In some examples, the enclosure system 130 is coupled to the factory interface 101 (e.g., via load port 129) to enable automated transfer of a process kit ring on a process kit ring carrier into the processing system 100A for replacement of a used process kit ring. In some examples, the enclosure system 130 is coupled to the factory interface 101 to enable automated transfer of a validation wafer into the processing system 100A for inspection of a processing chamber 107 or one or more components of a processing chamber.

In some embodiments, the enclosure system 130 includes a charging assembly to charge one or more validation wafers. Enclosure system 130 may include a battery to store electricity received from an outside source. In some embodiments, enclosure system 130 includes electrical connections to connect to and receive electricity from a component (e.g., the factory interface 101, load port 129, etc.) of processing system 100A via electrical connections of the component. In some embodiments, enclosure system 130 includes communication connections (e.g., electrical communication connections) to transmit data to and/or receive data from a component (e.g., the factory interface 101, load port 129, etc.) of processing system 100A via communication connections of the component. In some embodiments, the charging system includes a first coil to charge a validation wafer via inductive charging. Additionally, in some embodiments, the enclosure system 130 includes a processing device (e.g., processor, client device, computing device, etc.) to receive data from a validation wafer, factory interface 101, client device, server device, controller 109, etc. The data received may be indicative of a state of the validation wafer and/or a state of a processing chamber component. The processor of the enclosure system 130 may communicate with controller 109.

In some embodiments, the processing system 100A also includes first vacuum ports 103a, 103b coupling the factory interface 101 to respective degassing chambers 104a, 104b (e.g., load locks). Second vacuum ports 105a, 105b are coupled to respective degassing chambers 104a, 104b and disposed between the degassing chambers 104a, 104b and a transfer chamber 106 to facilitate transfer of substrates and content 113 (e.g., process kit rings, validation wafers) into the transfer chamber 106. In some embodiments, a processing system 100A includes and/or uses one or more degassing chambers 104 and a corresponding number of vacuum ports 103, 105 (e.g., a processing system 100A includes a single degassing chamber 104, a single first vacuum port 103, and a single second vacuum port 105). The transfer chamber 106 includes a plurality of processing chambers 107 (e.g., four processing chambers 107, six processing chambers 107, etc.) disposed therearound and coupled thereto. The processing chambers 107 are coupled to the transfer chamber 106 through respective ports 108, such as slit valves or the like. In some embodiments, the factory interface 101 is at a higher pressure (e.g., atmospheric pressure) and the transfer chamber 106 is at a lower pressure (e.g., vacuum). Each degassing chamber 104 (e.g., load lock, pressure chamber) has a first door (e.g., first vacuum port 103) to seal the degassing chamber 104 from the factory interface 101 and a second door (e.g., second vacuum port 105) to seal the degassing chamber 104 from the transfer chamber 106. Content is to be transferred from the factory interface 101 into a degassing chamber 104 while the first door is open and the second door is closed, the first door is to close, the pressure in the degassing chamber 104 is to be reduced to match the transfer chamber 106, the second door is to open, and the content is to be transferred out of the degassing chamber 104. A local center finding (LCF) device is to be used to align the content in the transfer chamber 106 (e.g., before entering a processing chamber 107, after leaving the processing chamber 107).

In some embodiments, the processing chambers 107 includes or more of etch chambers, deposition chambers (including atomic layer deposition, chemical vapor deposition, physical vapor deposition, or plasma enhanced versions thereof), anneal chambers, or the like.

Factory interface 101 includes a factory interface robot 111. Factory interface robot 111 includes a robot arm, such as a selective compliance assembly robot arm (SCARA) robot. Examples of a SCARA robot include a 2 link SCARA robot, a 3 link SCARA robot, a 4 link SCARA robot, and so on. The factory interface robot 111 includes an end effector on an end of the robot arm. The end effector is configured to pick up and handle specific objects, such as substrates. Alternatively, or additionally, the end effector is configured to handle objects such as a carrier, process kit rings (e.g., edge rings), and/or validation wafers. The robot arm has one or more links or members (e.g., wrist member, upper arm member, forearm member, etc.) that are configured to be moved to move the end effector in different orientations and to different locations.

The factory interface robot 111 is configured to transfer objects between enclosure systems 130 (e.g., cassettes, FOUPs) and degassing chambers 104a, 104b (or load locks). While conventional systems are associated with misalignment of content or opening of (e.g., disassembly of, breaking the seal of, contaminating) a processing system 100A (e.g., factory interface 101) to align misaligned content, the processing system 100A is configured to facilitate alignment of content (e.g., via one or more support structures of an enclosure system 130, via a removable rear window of the enclosure system 130) without opening of (e.g., disassembly of, breaking the seal of, contaminating) the processing system 100A by an operator. Accordingly, in some embodiments, a sealed environment including an interior volume of an enclosure system 130 and an internal volume of the factory interface 101 are maintained during the alignment of content (e.g., via one or more support structures of an enclosure system 130, via a removable rear window of the enclosure system 130).

Transfer chamber 106 includes a transfer chamber robot 115. Transfer chamber robot 115 includes a robot arm with an end effector at an end of the robot arm. The end effector is configured to handle particular objects, such as substrates. In some embodiments, the transfer chamber robot 115 is a SCARA robot, but has fewer links and/or fewer degrees of freedom than the factory interface robot 111 in some embodiments.

A controller 109 controls various aspects of the processing system 100A. In some embodiments, the controller 109 only controls the processing system 100A (e.g., without controlling other processing systems). In some embodiments, the controller 109 controls multiple processing systems. In some embodiments, controller controls a substrate processing facility. The controller 109 is and/or includes a computing device such as a personal computer, a server computer, a programmable logic controller (PLC), a microcontroller, and so on. The controller 109 includes one or more processing devices, which, in some embodiments, are general-purpose processing devices such as a microprocessor, central processing unit, or the like. More particularly, in some embodiments, the processing device is a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device is one or more special-purpose processing devices such as an application specific integrated circuit (ASIC), a field programmable gate array (FPGA), a digital signal processor (DSP), network processor, or the like. In some embodiments, the controller 109 includes a data storage device (e.g., one or more disk drives and/or solid state drives), a main memory, a static memory, a network interface, and/or other components. In some embodiments, the controller 109 executes instructions to perform any one or more of the methods or processes described herein. The instructions are stored on a computer readable storage medium, which include one or more of the main memory, static memory, secondary storage and/or processing device (during execution of the instructions). The controller 109 receives signals from and sends controls to factory interface robot 111 and substrate transfer chamber robot 115 in some embodiments.

FIG. 1A schematically illustrates transfer of content 113 (e.g., a process kit ring disposed on a carrier, validation wafer, etc.) into a processing chamber 107. According to one aspect of the disclosure, content 113 is removed from an enclosure system 130 via factory interface robot 111 located in the factory interface 101. The factory interface robot 111 transfers the content 113 through one of the first vacuum ports 103a, 103b and into a respective degassing chamber 104a, 104b. A transfer chamber robot 115 located in the transfer chamber 106 removes the content 113 from one of the degassing chambers 104a, 104b through a second vacuum port 105a or 105b. The transfer chamber robot 115 moves the content 113 into the transfer chamber 106, where the content 113 is transferred to a processing chamber 107 though a respective port 108. While not shown for clarity in FIG. 1A, transfer of the content 113 includes transfer of a process kit ring disposed on a carrier, transfer of an empty process kit ring carrier, transfer of a validation wafer, transfer of a component of processing system 100A disposed on a carrier, transfer of a substrate disposed on a carrier, transfer of an empty carrier, transfer of a process kit ring without a carrier, etc.

FIG. 1A illustrates one example of transfer of content 113, however, other examples are also contemplated. In some examples, it is contemplated that the enclosure system 130 is coupled to the transfer chamber 106 (e.g., via a load port mounted to the transfer chamber 106). From the transfer chamber 106, the content 113 is to be loaded into a processing chamber 107 by the transfer chamber robot 115. Processed content 113 (e.g., a used process kit ring, a validation wafer) is to be removed from the processing system 100A in reverse of any manner described herein.

In some embodiments, enclosure system disclosed herein is a FOUP (e.g., docked on a load port in communication with the factory interface). In some embodiments, the enclosure system disclosed herein is a side storage pod (SSP) that is directly mounted to the factory interface 101. In some embodiments, an additional SSP is positioned in communication with the factory interface 101 opposite the illustrated SSP. In some embodiments, processed content 113 is removed from degassing chamber 104 and loaded into SSP via robot 111 (e.g., to cool). In some embodiments, processed content 113 is removed from degassing chamber 104 and loaded into SSP via robot 111 (e.g., to cool). In some embodiments, a validation wafer may be removed from the SSP and placed into the SSP via robot 111.

When utilizing multiple enclosure systems 130 or a combination of enclosure system 130 and SSP, in some embodiments, one SSP or enclosure system 130 is to be used for unprocessed content 113 (e.g., new process kit rings, charged validation wafers), while another SSP or enclosure system 130 is to be used for receiving processed content 113 (e.g., used process kit rings, spent validation wafers). The enclosure system 130 is used to align content 113 (e.g., via one or more support structures in the enclosure system 130, via a removable rear window of the enclosure system 130) prior to transfer of content 113 via the robot arm and/or prior to transfer of the enclosure system 130. The one or more support structures aligning the content 113 and/or aligning the content 113 via the removable rear window of the enclosure system 130 enable the robot arm to correctly remove content 113 from specific locations in the enclosure system 130, enable the content 113 to be properly secured in the enclosure system 130 (e.g., enable the one or more support structures to secure the content 113), and enable the enclosure system 130 to properly transport content 113.

The processing system 100A includes chambers, such as factory interface 101 (e.g., equipment front end module (EFEM)) and adjacent chambers (e.g., load port 129, enclosure system 130, SSP, degassing chamber 104 such as a load lock, or the like) that are adjacent to the factory interface 101. One or more of the chambers is sealed (e.g., each of the chambers is sealed). The adjacent chambers are sealed to the factory interface 101. In some embodiments, inert gas (e.g., one or more of nitrogen, argon, neon, helium, krypton, or xenon) is provided into one or more of the chambers (e.g., the factory interface 101 and/or adjacent chambers) to provide one or more inert environments. In some examples, the factory interface 101 is an inert EFEM that maintains the inert environment (e.g., inert EFEM minienvironment) within the factory interface 101 so that users do not need to enter the factory interface 101 (e.g., the processing system 100A is configured for no manual access within the factory interface 101).

In some embodiments, gas flow (e.g., inert gas, nitrogen) is provided into one or more chambers (e.g., factory interface 101, enclosure system 130) of the processing system 100A. In some embodiments, the gas flow is greater than leakage through the one or more chambers to maintain a positive pressure within the one or more chambers. In some embodiments, the inert gas within the factory interface 101 is recirculated. In some embodiments, a portion of the inert gas is exhausted. In some embodiments, the gas flow of non-recirculated gas into the factory interface 101 is greater than the exhausted gas flow and the gas leakage to maintain a positive pressure of inert gas within the factory interface 101. In some embodiments, the factory interface 101 is coupled to one or more valves and/or pumps to provide the gas flow into and out of the factory interface 101. A processing device (e.g., of controller 109) controls the gas flow into and out of the factory interface 101 and/or enclosure system 130. In some embodiments, the processing device receives sensor data from one or more sensors (e.g., oxygen sensor, moisture sensor, motion sensor, door actuation sensor, temperature sensor, pressure sensor, etc.) and determines, based on the sensor data, the flow rate of inert gas flowing into and/or out of the factory interface 101 and/or enclosure system 130.

The enclosure system 130 allows for aligning of content 113 (e.g., carrier, process kit ring, validation wafer, and/or the like) without opening the sealed environment within the factory interface 101 and adjacent chambers. The enclosure system 130 seals to the load port 129 responsive to being docked on the load port 129. The enclosure system 130 provides purge port access so that the interior of the enclosure system 130 can be purged prior to opening the enclosure system 130 to minimize disturbance of the inert environment within the factory interface 101.

Figure 1B:
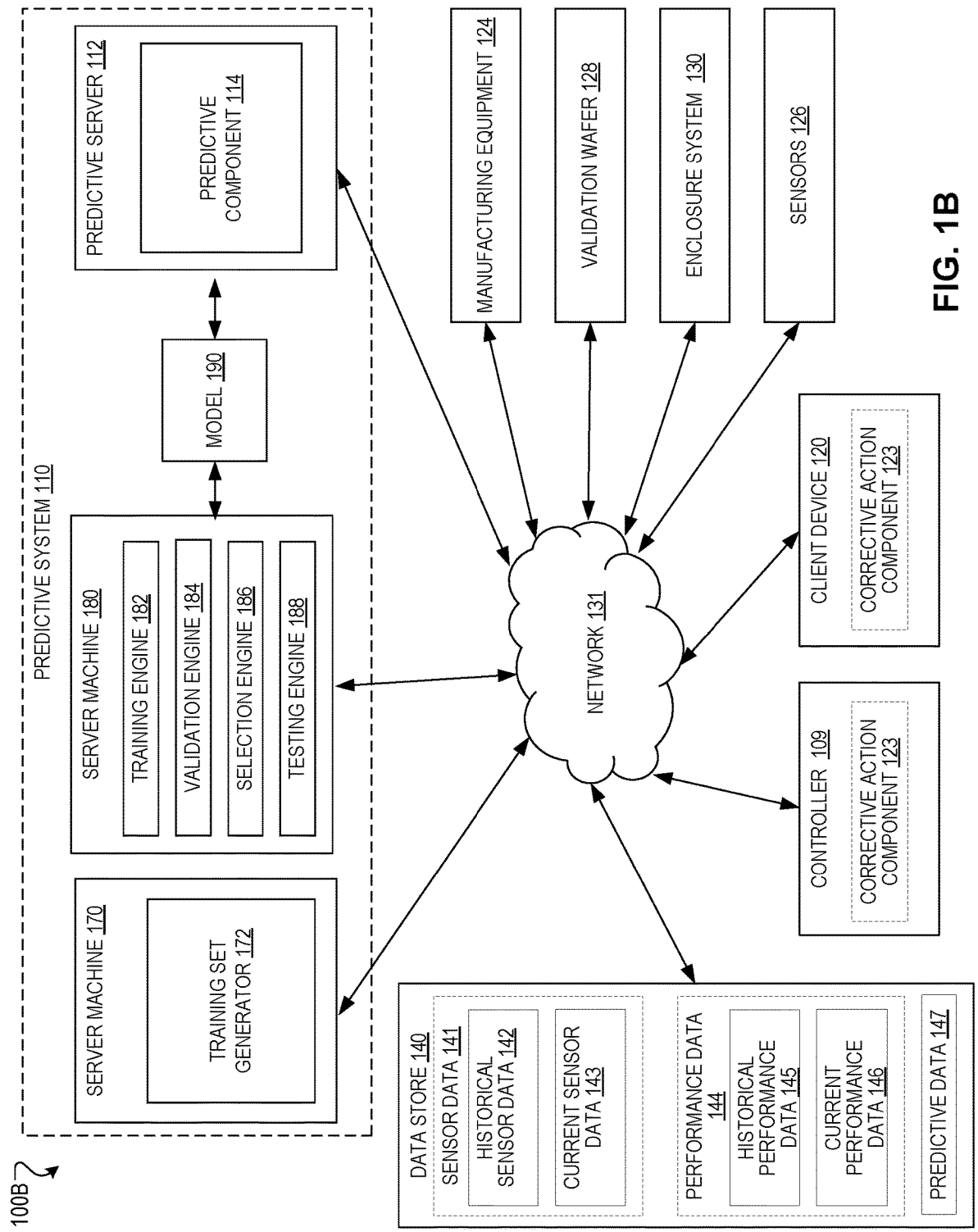
FIG. 1B is a block diagram illustrating an exemplary system architecture, according to certain embodiments.

FIG. 1B is a block diagram illustrating an exemplary system architecture, according to aspects of the present disclosure. In some embodiments, computer system architecture 100B may be included as part of a manufacturing system for processing substrates (e.g., processing system 100A). Computer system architecture 100B includes a client device 120, a controller 109 (e.g., facility controller, controller of processing system 100A, etc.), manufacturing equipment 124 (e.g., processing system 100A), sensors 126, validation wafer 128, a predictive server 112 (e.g., to generate predictive data, etc.), enclosure system 130 (e.g., FOUP, SSP), and a data store 140. The predictive server 112 can be part of a predictive system 110. The predictive system 110 can further include server machines 170 and 180.

The client device 120, controller 109, manufacturing equipment 124, predictive server 112, data store 140, predictive server 112, server machine 170, and server machine 180 can each be hosted by one or more computing devices including server computers, desktop computers, laptop computers, tablet computers, notebook computers, personal digital assistants (PDAs), mobile communication devices, cell phones, hand-held computers, cloud servers, cloud-based systems (e.g., cloud service device, cloud network device), or similar computing devices.

The sensors 126 are configured to capture sensor data 141 before, during, or after substrate processing by the manufacturing equipment 124. In some embodiments, one or more of the sensors 126 are disposed within manufacturing equipment 124. In some embodiments, validation wafer 128 is an inspection wafer that includes sensors 126 (e.g., imaging sensors, such as cameras) that provide sensor data 141 to inspect an interior of a chamber of manufacturing equipment 124 and/or a component of manufacturing equipment 124.

Sensor data 141 may include one or more of temperature data (e.g., heater temperature), spacing data (SP), pressure data, high frequency radio frequency (HFRF) data, voltage data of electrostatic chuck (ESC), electrical current data, flow data, power data, voltage data, optical frequency data, waveform data, image data, etc. Sensor data 141 may be associated with or indicative of manufacturing parameters such as hardware parameters, such as settings or components (e.g., size, type, etc.) of the manufacturing equipment 124, or process parameters of the manufacturing equipment 124. In some embodiments, the sensor data 141 can be provided while the manufacturing equipment 124 is performing manufacturing processes (e.g., equipment readings when processing products), or after the manufacturing equipment 124 has completed a manufacturing process, in additional or alternative embodiments. Sensor data 141 may be associated with or indicative of quality of components (e.g., process kit rings).

Validation wafer 128 provides data associated with a chamber and/or a component of manufacturing equipment 124. In some embodiments, validation wafer 128 collects data by one or more sensors (e.g., imaging device, such as a camera). Validation wafer 128 may include multiple imaging sensors to capture images of a lid of a chamber (e.g., processing chamber, EFEM, transfer chamber, load lock, FOUP, SSP, etc.), one or more sidewalls of a chamber, a bottom wall of a chamber, and/or a component of a chamber (e.g., process kit ring). Images from the multiple imaging sensors may be stitched together to generate a stitched image of the entire interior surface of the chamber. In some embodiments, the imaging sensors capture the visible spectrum of light. In some embodiments, the imaging sensors capture thermal radiation and/or visible light.

In some embodiments, validation wafer 128 includes one or more sensors (e.g., three sensors) to emit and receive a light beam to measure a distance the light beam has traveled. In some embodiments, validation wafer 128 includes a displacement sensor, an impedance sensor, and/or an acoustic sensor. Validation wafer 128 may include multiple sensors, including a pressure sensor, a temperatures sensor, a vibration sensor, an accelerometer, and/or a reflectometry sensor. In some embodiments, validation wafer 128 includes a piezo-resistive sensor and/or a piezoelectric acoustic sensor. In some embodiments, validation wafer 128 includes a no-contact sensor. The no-contact sensor may include a radar sensor that can scan a surface of a component of a processing chamber. Further, the no-contact sensor may include an x-ray emitter (e.g., an x-ray laser) and an x-ray detector. Additionally, validation wafer 128 may include an illumination component. The illumination component may at least partially illuminate an interior volume of a chamber.

In some embodiments, validation wafer 128 provides sensor data 141 to determine whether a component of manufacturing equipment 124 is in a predefined state (e.g., predefined orientation). For example, validation wafer 128 may provide sensor data 141 to verify placement of a process kit ring in a processing chamber of manufacturing equipment 124. Sensor data 141 may include alignment data (e.g., of a process kit ring disposed in a processing chamber), image data (e.g., one or more captured images), light beam data (e.g., laser light beam data), vibration data, temperature data, humidity data, process gas data, particle data, pressure data, proximity data, displacement data, impedance data, acoustic data, placement data, etc. Sensor data 141 may be associated with a condition of a process kit ring disposed in a processing chamber. In some embodiments, sensor data 141 may be associated with a condition of validation wafer 128.

Validation wafer 128 may include a memory to store sensor data. Validation wafer 128 may include a power source (e.g., an electrical storage device, rechargeable battery). In some embodiments, validation wafer 128 includes one or more super-capacitors to store electrical energy used to power validation wafer 128. A super-capacitor may be a high-capacity capacitor with a capacitance value much higher than a conventional capacitor. In some embodiments, a super-capacitor stores 10 to 100 times more electrical energy per unit volume than an electrolytic capacitor. In some embodiments, a super-capacitor can be recharged. A super-capacitor may not contaminate a process chamber if dropped and broken inside the process chamber. In some embodiments, a super-capacitor can supply high electrical current for a short duration of time. Additionally, a super-capacitor may not pose a fire danger if dropped on a hot chuck of a processing chamber.

Validation wafer 128 may be charged by a charging assembly of enclosure system 130 (e.g., FOUP, SSP). Validation wafer 128 may provide sensor data 141 and corrective action component 123 may determine, based on the sensor data 141, a state of the processing chamber and/or a state of the validation wafer 128. For example, validation wafer 128 may provide sensor data 141 (e.g., image data) and corrective action component 123 may determine, based on the sensor data 141, whether to cause performance of a corrective action to replace a process kit ring. Validation wafer 128 may include white listing and/or black listing capabilities so that the validation wafer 128 communicates data to an appropriate destination (e.g., client device 120, controller 121, data store 140, enclosure system 130, manufacturing equipment 124, etc.). For example, white listing may include allowing only certain destination devices (e.g., a given client device 120, a given controller 121, a given data store 140, a given enclosure system 130, a given piece of manufacturing equipment 124, etc.) to communicate with a given validation wafer 128. In some embodiments, only certain devices may receive data from a given validation wafer 128 under a white listing scheme. In another example, black listing may include disallowing certain destination devices to communicate with a given validation wafer 128. In some embodiments, certain devices may be disallowed from receiving data from a given validation wafer 128 under a black listing scheme. Validation wafer 128 may communicate wirelessly with a remote device (e.g., client device 120, controller 121, data store 140, enclosure system 130, manufacturing equipment 124, etc.). In some embodiments, validation wafer 128 communicates via WiFi. In some embodiments, validation wafer 128 communicates via Bluetooth. In some embodiments, validation wafer 128 includes a wireless (e.g., Bluetooth) interface to communicate with a host device. In another example, validation wafer 128 may provide sensor data 141 and corrective action component 123 may determine, based on the sensor data 141, whether to cause performance of a corrective action to cause the validation wafer 128 to be charged (e.g., electrically charged). In some embodiments, sensor data 141 provided by validation wafer 128 may include image data (e.g., images, etc.).

The client device 120 includes a computing device such as a personal computer (PC), laptop, mobile phone, smart phone, tablet computer, netbook computer, network connected television ("smart TV"), network-connected media player (e.g., Blu-ray player), a set-top box, over-the-top (OTT) streaming device, operator box, cloud server, cloud-based system (e.g., cloud service device, cloud network device), etc. The client device 120 may be capable of performing cloud-based operations (e.g., with predictive system 110, data store 140, manufacturing equipment 124, enclosure system 130, validation wafer 128, controller 121, etc.). In some embodiments, the sensor data 141 may be received from the client device 120. In some embodiments, client device 120 displays a graphical user interface (GUI), where the GUI enables the user to provide, as input, portions of the manufacturing equipment 124 (e.g., process kit rings) to be inspected. In some embodiments, client device 120 includes corrective action component 123 to perform one or more methods (e.g., see FIG. 5).

The controller 109 includes one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), a cloud server, a system stored on one or more clouds, etc. In some embodiments, the controller 109 includes a corrective action component 123 to perform one or more methods (e.g., see FIG. 5. In some embodiments, controller 109 controls manufacturing equipment 124. In some embodiments, controller 109 controls a manufacturing facility that includes manufacturing equipment 124.

Data store 140 can be a memory (e.g., random access memory), a drive (e.g., a hard drive, a flash drive), a database system, a cloud-based system, or another type of component or device capable of storing data. Data store 140 can include multiple storage components (e.g., multiple drives or multiple databases) that may span multiple computing devices (e.g., multiple server computers, multiple clouds).

The data store 140 can store sensor data 141 received from sensors 126, validation wafer 128, and/or enclosure system 130. For example, data store 140 can store sensor data 141 collected by validation wafer 128 during inspection of a processing chamber. Sensor data 141 can include historical sensor data 142 (e.g., sensor data collected by validation wafer 128 during a historical inspection) and/or current sensor data 143 (e.g., sensor data collected by validation wafer 128 during a current inspection). Historical sensor data 142 can be used to train a machine learning model 190. Current sensor data 143 can used to determine predictive data 147 (e.g., using trained machine learning model 190).

The data store 140 can store performance data 144. Performance data 144 can include historical performance data 145 and current performance data 146. In some embodiments, corrective action component 123 generates performance data 144 based on the sensor data 141. For example, corrective action component 123 determines, based on sensor data 141 that includes image data of process kit rings disposed in a processing chamber of the manufacturing equipment 124, performance data 144 indicative of whether a process kit ring is to be replaced (e.g., process kit ring is defective). In another example, corrective action component 123 determines, based on sensor data 141 that includes charge data of validation wafer 128, performance data 144 indicative of whether validation wafer 128 is to be recharged (e.g., a super-capacitor of validation wafer 128 is low on charge). In a further example, corrective action component 123 determines, based on sensor data 141 that includes charge data of an enclosure system charging assembly battery, performance data 144 indicative of whether the enclosure system charging assembly battery is to be recharged (e.g., the enclosure system charging assembly battery is low on charge). In some embodiments, corrective action component 123 determines performance data 144 based on user input that is responsive to the sensor data 141 (e.g., user provides user input indicative that a process kit ring is to be replaced responsive to the user examining the image data).

The data store 140 can store predictive data 147. Predictive data 147 may be predictive performance data 144. The corrective action component 123 may provide the sensor data 141 to predictive component 114 and receive from predictive component 114 predictive data indicative of a corrective action that is to be performed. In some embodiments, corrective action component 123 provides sensor data 141 of image data associated with installed process kit rings to predictive component 114 and predictive component 114 provides predictive data 147 of whether the process kit ring is to be replaced (e.g., without user inspection of the sensor data 141.

In some embodiments, predictive system 110 includes server machine 170 and server machine 180. Server machine 170 includes a training set generator 172 that is capable of generating training data sets (e.g., a set of data inputs and a set of target outputs) to train, validate, and/or test a machine learning model 190. Some operations of training set generator 172 are described in detail below with respect to FIG. 6A. In some embodiments, the training set generator 172 can partition the training data into a training set, a validating set, and a testing set. In some embodiments, the predictive system 110 generates multiple sets of training data.

Server machine 180 includes a training engine 182, a validation engine 184, a selection engine 186, and/or a testing engine 188. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 can be capable of training a machine learning model 190. The machine learning model 190 can refer to the model artifact that is created by the training engine 182 using the training data that includes training inputs and corresponding target outputs (correct answers for respective training inputs). The training engine 182 can find patterns in the training data that map the training input to the target output (the answer to be predicted), and provide the machine learning model 190 that captures these patterns. In some embodiments, the machine learning model 190 uses one or more of support vector machine (SVM), Radial Basis Function (RBF), clustering, supervised machine learning, semi-supervised machine learning, unsupervised machine learning, k-nearest neighbor algorithm (k-NN), linear regression, supervised regression, random forest, neural network (e.g., artificial neural network), etc.

The validation engine 184 can be capable of validating a trained machine learning model 190 using a corresponding set of features of a validation set from training set generator 172. The validation engine 184 can determine an accuracy of each of the trained machine learning models 190 based on the corresponding sets of features of the validation set. The validation engine 184 can discard a trained machine learning model 190 that has an accuracy that does not meet a threshold accuracy. In some embodiments, the selection engine 186 can be capable of selecting a trained machine learning model 190 that has an accuracy that meets a threshold accuracy. In some embodiments, the selection engine 186 can be capable of selecting the trained machine learning model 190 that has the highest accuracy of the trained machine learning models 190.

The testing engine 188 can be capable of testing a trained machine learning model 190 using a corresponding set of features of a testing set from training set generator 172. For example, a first trained machine learning model 190 that was trained using a first set of features of the training set can be tested using the first set of features of the testing set. The testing engine 188 can determine a trained machine learning model 190 that has the highest accuracy of all of the trained machine learning models based on the testing sets.

Predictive server 112 includes a predictive component 114 that is capable of providing sensor data 141 collected by one or more sensors 126 (e.g., sensor data 141 collected by validation wafer 128 during an inspection of a chamber of manufacturing equipment 124, such as processing chamber 107 of FIG. 1A) to trained machine learning model 190 and running trained machine learning model 190 on the input to obtain one or more outputs.

The client device 120, controller 109, manufacturing equipment 124, sensors 126, validation wafer 128, enclosure system 130, predictive server 112, data store 140, server machine 170, and/or server machine 180 can be coupled to each other via a network 131. In some embodiments, network 131 is a public network that provides client device 120 with access to predictive server 112, data store 140, and other publically available computing devices. In some embodiments, network 131 is a private network that provides client device 120 access to manufacturing equipment 124, validation wafer 128, enclosure system 130, data store 140, and other privately available computing devices. Network 131 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

It should be noted that in some other implementations, the functions of server machines 170 and 180, as well as predictive server 112, may be provided by a fewer number of machines. For example, in some embodiments, server machines 170 and 180 may be integrated into a single machine, while in some other or similar embodiments, server machines 170 and 180, as well as predictive server 112, may be integrated into a single machine.

In general, functions described in one implementation as being performed by server machine 170, server machine 180, and/or predictive server 112 can also be performed on client device 120. In addition, the functionality attributed to a particular component can be performed by different or multiple components operating together.

In embodiments, a "user" can be represented as a single individual (e.g., an operator, a technician, an engineer, etc.). However, other embodiments of the disclosure encompass a "user" being an entity controlled by a plurality of users and/or an automated source. For example, a set of individual users federated as a group of administrators may be considered a "user."

Figure 2A:
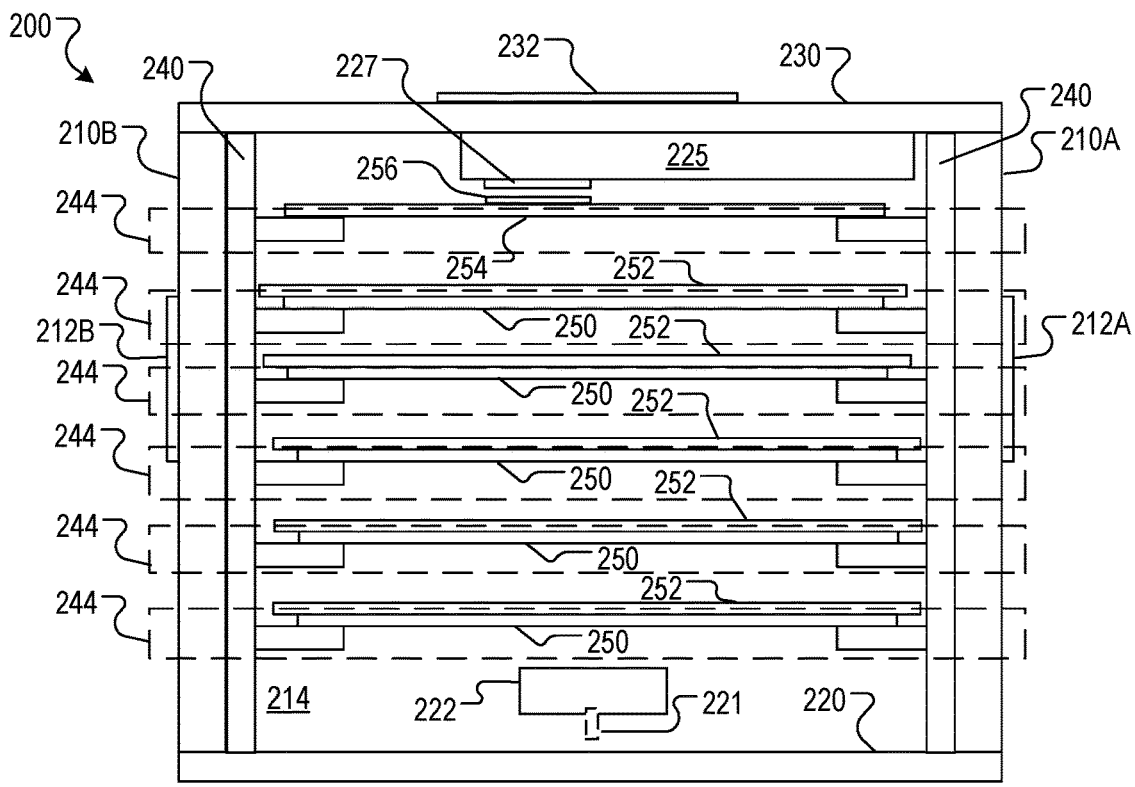
FIGS. 2A-B illustrate front views of enclosure systems, according to certain embodiments.
Figure 2B:
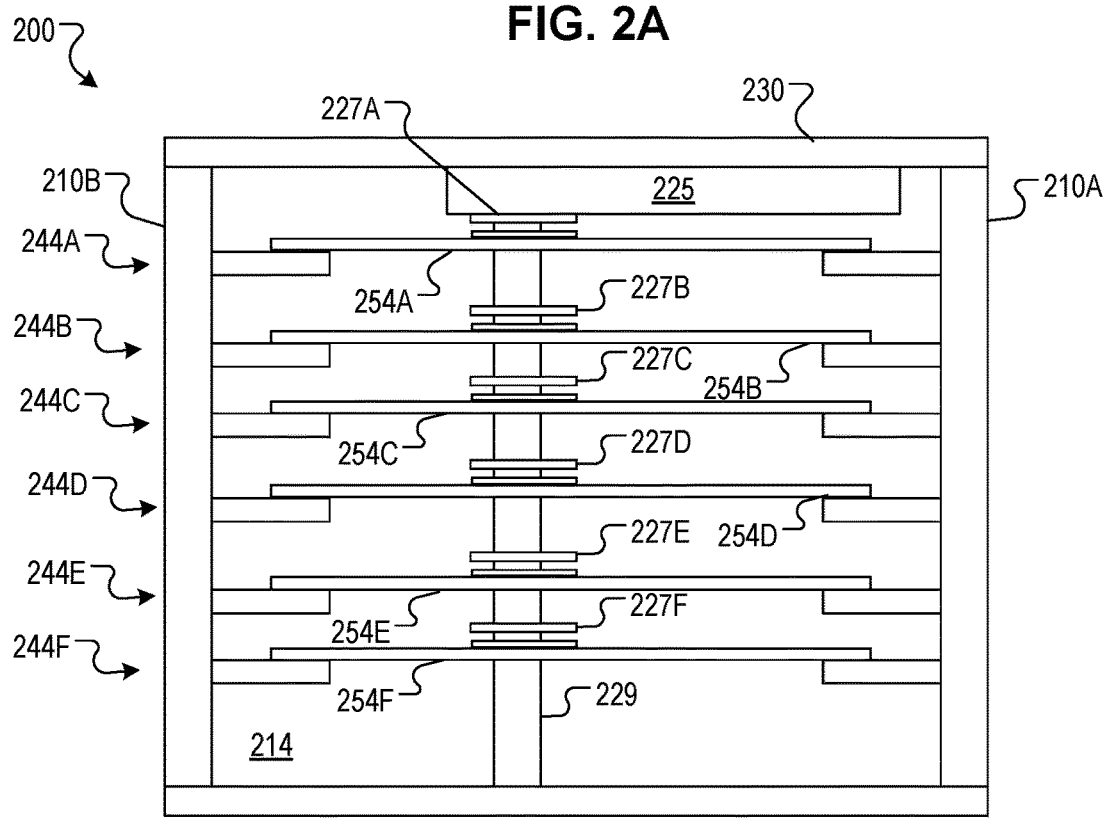
Figure 2C:
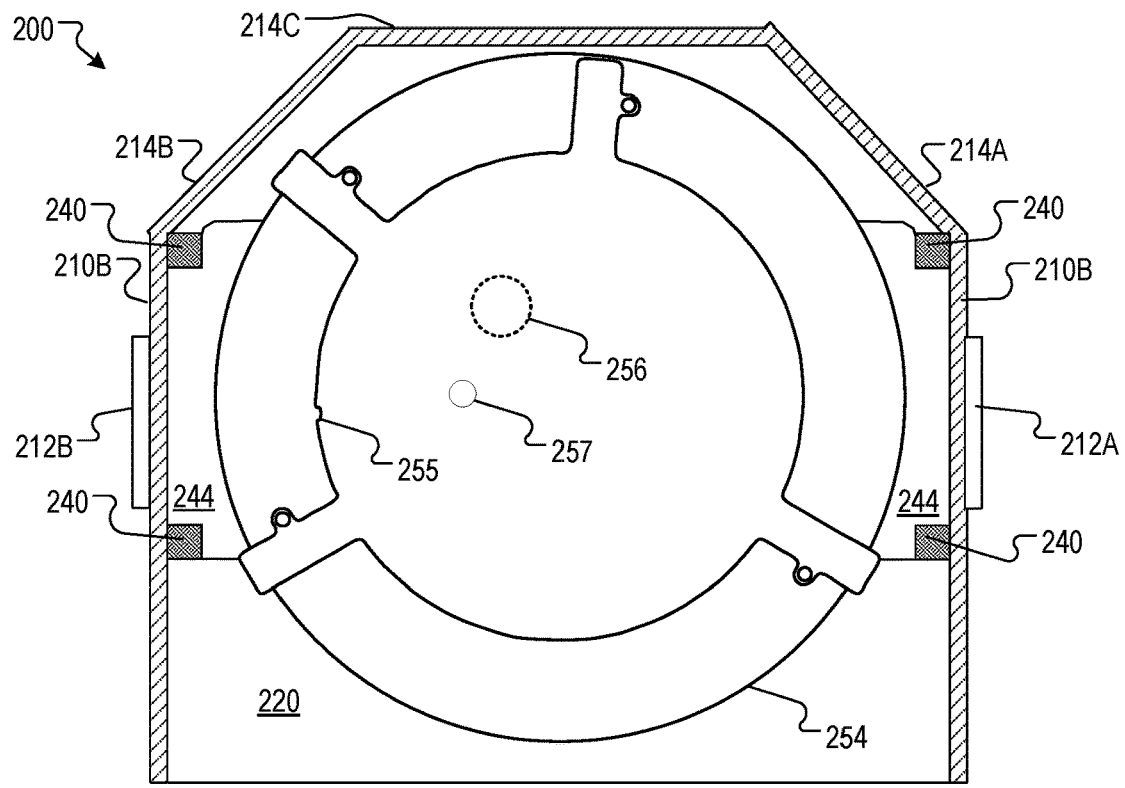
FIG. 2C illustrates a cross-sectional upper view of an enclosure system, according to certain embodiments.
Figure 2D:
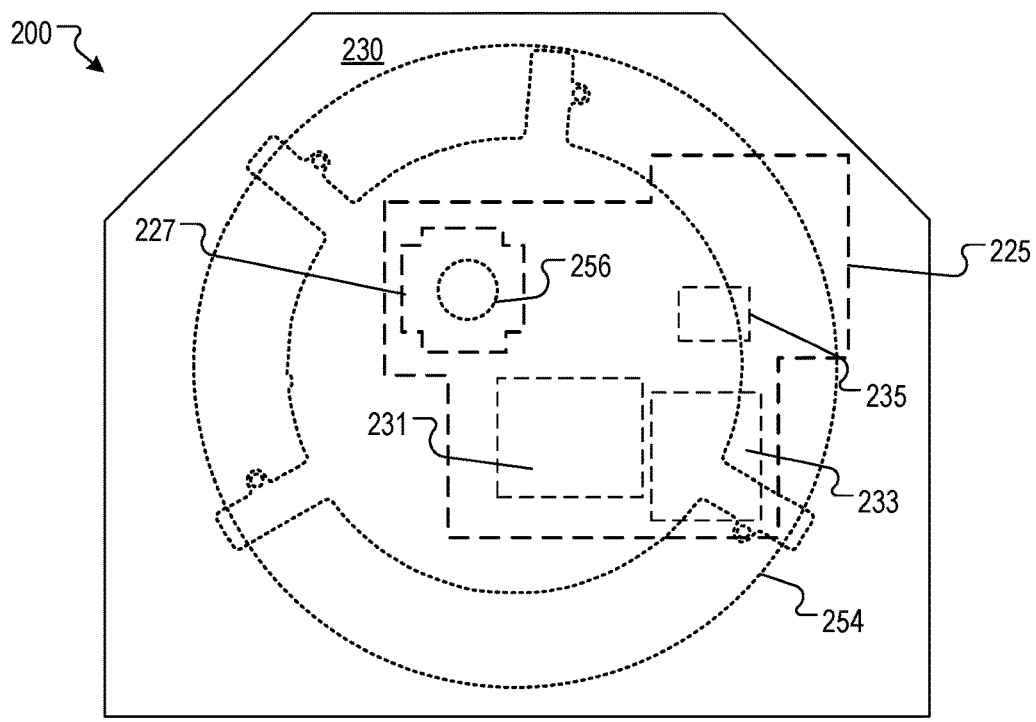
FIG. 2D illustrates an upper view of an enclosure system, according to certain embodiments.

FIGS. 2A-B illustrate front views of enclosure systems 200 (e.g., enclosure system 130 of FIG. 1A), according to certain embodiments. FIG. 2C illustrates a cross-sectional upper view of an enclosure system 200, according to certain embodiments. FIG. 2D illustrates an upper view of an enclosure system 200, according to certain embodiments. In some embodiments, features that have reference numbers that are similar to reference numbers in other figures include similar features and/or functionality as those described in other figures. In some examples, enclosure system 200 has similar features and/or functionality as enclosure system 130 of FIG. 1A. In some embodiments, enclosure system 200 is a side storage pod (e.g., SSP of FIG. 1A).

Referring to FIG. 2A, enclosure system 200 includes walls including sidewalls 210 (e.g., sidewalls 210A-B), one or more rear walls 214 (see rear walls 214A-C of FIG. 2C), and bottom wall 220. Enclosure system 200 includes an enclosure lid 230 (e.g., removable upper wall) configured to couple to (e.g., top surface mounted, side perimeter mounted) one or more of the walls (e.g., one or more sidewalls 210 and/or one or more rear walls 214) to at least partially enclose an interior volume of the enclosure system 200. Enclosure lid 230 may be a removable lid of the enclosure system 200. In some embodiments, the enclosure lid 230 is configured to removably attach to one or more of the walls.

In some embodiments, the enclosure lid 230 includes an overhead transport component 232 (e.g., for transportation of the enclosure system 200). In some embodiments, the enclosure system 200 has one or more windows (e.g., observation windows).

In some embodiments, posts 240 are coupled to the bottom wall 220 (e.g., via a base connector and one or more fasteners). The posts 240 removably interface with enclosure lid 230. Support structures 244 are coupled (e.g., via fasteners) to the posts 240 and/or walls (e.g., one or more sidewalls 210 and/or one or more rear walls 214).

The support structures 244 are disposed in the interior volume of the enclosure system 200. Each set of one or more support structures 244 may be configured to support a corresponding object (e.g., content 113 of FIG. 1A, process kit ring, carrier, process kit ring disposed on a carrier, validation wafer).

In some embodiments, two or more support structures 244 (e.g., two shelves disposed opposite each other, a first shelf disposed proximate sidewall 210A and a second shelf disposed proximate sidewall 210B) support an object. In some embodiments, the first and second support structures 244 that support an object are substantially a mirror image of each other (e.g., dimensions of the two support structures are a substantial mirror of each other).

In some embodiments, a single support structure 244 (e.g., a single shelf that wraps from sidewall 210A to sidewall 210B along the one or more rear walls 214) supports an object. In some embodiments, a support structure 244 has a first distal end proximate sidewall 210A and a second distal end proximate sidewall 210B. In some embodiments, support structure 244 is a U-shaped shelf (e.g., wrapping around the back of enclosure system 200).

In some embodiments, each support structure 244 is connected to one or more posts that are coupled to the bottom wall 220. Each post may removably interface with enclosure lid 230. In some embodiments, each post may be disposed adjacent to sidewall 210A or sidewall 210B. In some embodiments, each support structure 244 is connected to one or more of sidewall 210A and/or 210B. In some embodiments a first set of posts 240 (e.g., a first pair of posts 240, two posts 240) are coupled to the bottom wall 220 (e.g., via the same base connector) proximate sidewall 210A and a second set of posts 240 (e.g., a second pair of posts 240, two additional posts 240) are coupled to the bottom wall 220 (e.g., via a different base connector) proximate sidewall 210B. A set of support structures 244 (e.g., a pair of shelves, two shelves, a first shelf and a second shelf, coplanar shelves) may be used to support an object (e.g., content 113). The first support structure 244 may be attached to the first set of posts 240 and the second support structure 244 may be attached to the second set of posts 240. A first subset of the support structures 244 and a second subset of the support structures 244 may be oriented opposite each other in the interior volume of enclosure system 200 (e.g., are in mirrored locations from each other).

The support structures 244 are configured to support objects, such as a carrier 250, one or more process kit rings 252 disposed on a carrier 250, a validation wafer 254, a substrate, and/or the like. In some embodiments a validation wafer 254 is disposed on one or more first support structures 244 (e.g., one or more support structures 244 located closest to the enclosure lid 230). In some embodiments, a carrier is disposed on one or more second support structures 244, and one or more process kit rings 252 are disposed on the carrier 250 without the process kit rings 252 contacting the one or more second support structures 244. Each support structure 244 may form a recess to guide the process kit ring 252 into the correct location on the carrier 250 responsive to the enclosure system 200 being moved (e.g., jostled, moved rapidly). In some embodiments, a validation wafer 254 is disposed on the one or more top support structures 244. In some embodiments, validation wafer 254 has a thickness of less than approximately 10 millimeters (mm). In some embodiments, validation wafer 254 has a diameter that substantially matches a diameter of a substrate (e.g., about 300 mm or about 450 mm).

In some embodiments, an upper window (e.g., disposed in the enclosure lid 230) is configured for orientation verification (e.g., automated or manual orientation verification) of objects disposed in the interior volume. In some embodiments, a rear window (e.g., located in a rear wall 214) is removable for orientation adjustment (e.g., manual or automated orientation adjustment) of one or more of the objects.

In some embodiments, each of the process kit rings 252 has a corresponding flat portion (e.g., flat interior portion) that is viewable via the upper window, via a sensor (e.g., imaging sensor) of the enclosure system 200, and/or a sensor (e.g., imaging sensor) of the validation wafer 254. In some embodiments, each of the process kit rings 252 includes a feature (e.g., notch, perimeter notch, recess, marking, upper surface perimeter notch, etc.) on an upper surface (or lower surface) of the process kit ring 252 that is viewable via the upper window and/or a sensor of the enclosure system 200 or validation wafer 254. In some embodiments, the flat portion and/or feature (e.g., on an upper surface) of each of the process kit rings 252 are viewable via the upper window and/or a sensor of the enclosure system 200 or validation wafer 254 at the same time (e.g., simultaneously). In some embodiments, each carrier 250 has a carrier feature that is viewable via the upper window and/or a sensor of the enclosure system 200 or validation wafer 254 at the same time. In some embodiments, the carrier feature of each carrier 250, the feature on the upper surface of each process kit ring 252, and the flat portion of each process kit ring 252 are viewable at the same time via the upper window and/or a sensor of the enclosure system 200 or validation wafer 254. Responsive to the flat portion of a process kit ring 252 not being in a correct location or the carrier feature not being in a correct location, the rear window 236 may be removed to adjust orientation of the process kit ring 252 and/or carrier 250. Responsive to the feature of the upper portion of a process kit ring 252 not being viewable via the upper window and/or a sensor of the enclosure system 200 or validation wafer 254 (e.g., not being in an upward orientation, being flipped over), the enclosure lid 230 and/or the enclosure door are removed to flip the process kit ring 252.

A corresponding upper surface of each of the posts 240 may be configured to removably interface with a corresponding component of the enclosure lid 230. In some embodiments, the corresponding upper surface of each of the posts 240 forms a tapered recess configured to receive a tapered protrusion (e.g., fastener, etc.) coupled to the enclosure lid 230 to align each of the posts 240 with the enclosure lid 230.

Each of the one or more support structures 244 may be configured to align objects (e.g., content 113 of FIG. 1A), such as a carrier 250, a process kit ring 252, and/or a validation wafer 254. In some embodiments, each of the one or more support structures 244 has alignment features and/or surfaces that are configured to align objects on the one or more support structures 244. If a robot arm places an object on one or more support structures 244 in an incorrect position and/or transportation of the enclosure system 200 causes movement of the object, the alignment features and/or surfaces align the object into a correct position. In some embodiments, one or more support structures 244 has retaining devices configured to secure the object to the one or more support structures 244.

In some embodiments, the interior volume of the enclosure system 200 is a mini environment (e.g., sealed environment). In some embodiments, the interior volume of the enclosure system 200 is kept substantially particle free (e.g., substantially uncontaminated). In some embodiments, the enclosure system 200 includes a fan (e.g., at the top surface) that suppresses any particles in the interior volume. In some embodiments, the interior volume is substantially devoid (or completely devoid) of one or more of moisture, oxygen, particles (e.g., dust), or the like.

One or more of the walls of the enclosure system 200 may form or may be coupled to a front interface. The front interface is configured to interface with (e.g., seal to) a door for transportation of the enclosure system 200 (e.g., and to provide a sealed environment). The front interface is configured to interface (e.g., seal to) a substantially vertical portion of a load port of a substrate processing system. Responsive to the front interface being sealed to a door or the load port, the enclosure system 200 creates a sealed environment (e.g., gases and/or particles do not leave or enter the enclosure system 200 from the surrounding environment outside of the substrate processing system).

In some embodiments, the bottom wall 220 includes or is coupled to a baseplate (e.g., adaptor plate). The baseplate is configured to interface with a horizontal portion of the load port. The baseplate has features (e.g., recesses, receptacles, kinematic interface) to receive kinematic devices (e.g., kinematic pins, precision located pins) of the horizontal portion of the load port. In some embodiments the baseplate is secured to the bottom wall 220 prior to interfacing the enclosure system 200 with the load port. In some embodiments, the baseplate is secured to the load port and then the bottom wall 220 is secured to the baseplate. In some embodiments, the enclosure system 200 has a seal (e.g., crushable seal, gasket) to seal one or more openings in the bottom wall 220.

In some embodiments, one or more of an overhead transport component 232 (e.g., overhead transport flange) or at least one handle (e.g., handles 212A and 212B) is coupled to one or more surfaces of the enclosure system 200 for transport (e.g., automated transport, manual transport, etc.) of the enclosure system 200. In some embodiments, the overhead transfer (OHT) component 232 is coupled (e.g., attached) to the enclosure lid 230. In some embodiments, a first handle is disposed on a sidewall 210A and a second handle is disposed on sidewall 210B.

In some embodiments, one or more purge adaptors are disposed in the bottom wall 220 (e.g., inserted into openings formed in the bottom wall 220). The purge adaptors are used to one or more of fill the enclosure system 200 with a gas (e.g., Nitrogen ($N_2$)), inert gas, remove gas from the enclosure system, pass a gas through the enclosure system 200, or the like. The purge adaptors extend through the baseplate to fluidly couple with one or more of a gas or vacuum line (e.g., for purging the enclosure system 200, for creating a vacuum in the enclosure system 200, for filling the enclosure system 200 with a gas, etc.). Each of the purge adaptors provides a seal at a corresponding opening in the bottom wall 220 (e.g., to provide a sealed environment). In some embodiments, the enclosure system 200 seals to the load port responsive to being docked to the load port. The interior volume of the enclosure system 200 is configured to be purged via the one or more purge adaptors prior to opening of the enclosure system 200.

In some embodiments, enclosure system 200 includes a charging assembly 225. Charging assembly 225 may include a charging coil 227 disposed above one or more first support structures 244. Charging assembly 225 may provide electrical energy to a charging interface 256 of the validation wafer 254. In some embodiments, one or more first support structures 244 are configured to support a validation wafer 254 within a threshold distance of the charging coil 227. In some embodiments, the threshold distance may be approximately 5-9 millimeters. In some embodiments, the threshold distance is approximately 7 millimeters. In some embodiments, the threshold distance allows a robot arm (e.g., a transfer robot arm, EFEM robot) to lift validation wafer 254 from the one or more support structures 244 to remove validation 254 from enclosure system 200 without a top surface of validation wafer 254 (e.g., charging interface 256) contacting charging coil 227. The one or more first support structures 244 may be further configured to align the charging interface 256 with the charging coil 227. Charging assembly 225 may include a rechargeable battery to store electricity to charge validation wafer 254. Charging assembly 225 may include a lithium-ion battery. Charging assembly 225 may include a battery bank. In some embodiments, the battery of charging assembly 225 may have a capacity of approximately 10,000 milliamp hours. Validation wafer 254 (e.g., a battery of validation wafer 254) may be charged from charging coil 227 via inductive charging. Validation wafer 254 may receive electrical charge from charging coil 227 by way of charging interface 256 (e.g., a coil of charging interface 256) of the validation wafer 254. In some embodiments, charging assembly 225 can charge an electrical storage device (e.g., battery, super-capacitor) of validation wafer 254 via wireless charging (e.g., inductive charging). The charging of validation wafer 254 may be responsive to validation wafer 254 being placed within the threshold distance of charging coil 227, and charging interface 256 being aligned with charging coil 227. Additionally, in some embodiments, charging of validation wafer 254 may be responsive to a command by a controller (e.g., of charging assembly 225).

In some embodiments, charging assembly 225 receives electrical power from an external source (e.g., a wall outlet of a substrate manufacturing facility). In some embodiments, charging assembly 225 receives electrical power from a substrate processing system (e.g., processing system 100A) via an electrical connection of the enclosure system 200 with an EFEM interface (e.g., load port 129 of FIG. 1A). In some embodiments, charging assembly 225 includes a controller (e.g., processing device, microcontroller, computing device, etc.). The controller may manage charging of validation wafer 254. In some embodiments, the controller tracks an inventory of the enclosure system 200 (e.g., an inventory of process kit rings 252, an inventory of validation wafers 254, etc.) based on maintenance procedures performed, sensor data (e.g., image data, from sensors of the enclosure system 200 and/or validation wafers 254), and/or user input.

In some embodiments, enclosure system 200 includes a radio-frequency identification (e.g., RFID 221) held by RFID holder 222. RFID 221 may store and/or broadcast data associated with the enclosure system 200. For example, RFID 221 may store and/or broadcast data indicative of an enclosure type that enclosure system 200 is. In another example, RFID 221 may store and/or broadcast indicative of an inventory (e.g., an inventory of process kit rings 252, validation wafers 254, etc.) of the enclosure system 200. In some embodiments, data stored by RFID 221 may be read by an RFID reader (e.g., an RFID reader of a load port 129 of FIG. 1A). In some embodiments, RFID holder 222 holds RFID 221 in a horizontal or in a vertical orientation. RFID holder 222 may hold RFID 221 proximate rear wall 214. In some embodiments, RFID holder 222 is coupled to bottom wall 220.

Referring to FIG. 2B, in some embodiments, charging assembly 225 includes multiple charging coils 227 (e.g., disposed above corresponding one or more support structures 244). Charging coil 227A is disposed under the enclosure lid 230 and above one or more support structures 244A that are configured to support a first object (e.g., validation wafer 254A). A charging coil 227B may be disposed beneath the one or more support structures 244A (e.g., the one or more top support structures). The charging coil 227B is disposed above one or more support structures 244B that are configured to support a second object (e.g., validation wafer 254B). The one or more support structures 244B may be configured to support a validation wafer 254B within the threshold distance of the second charging coil 227B. In some embodiments, the one or more support structures 244B may be configured to position the validation wafer 254B to align a charging interface 256 of the validation wafer 254B with the charging coil 227B. The validation wafer 254B may be charged responsive to being supported by the one or more support structures 244B within the threshold distance from the second charging coil 227B and with a charging interface of the validation wafer 254B aligned with the charging coil 227B. In some embodiments, one or more of the charging coils 227 are supported by a charging assembly support structure 229 (e.g., that is disposed along a rear wall 214 or a sidewall 210). In some embodiments, charging assembly support structure 229 includes electrical connections to electrically couple the one or more charging coils 227 with the battery of charging assembly 225.

Referring to FIG. 2C, validation wafer 254 may include a user interface. In some embodiments, the user interface includes a switch 255 (e.g., on/off switch) and/or an indicator 257. In some embodiments, switch 255 is a power switch of validation wafer 254. For example, turning switch 255 to an "off" position may turn validation wafer 254 off. Additionally, turning switch 255 to an "on" position may turn validation wafer 254 on. In some embodiments, switch 255 is manipulated by a user (e.g., a technician, an operator, etc.) while validation wafer 254 is outside enclosure system 200. In some embodiments, switch 255 is manipulated by the user while validation wafer 254 is supported by one or more support structures 244.

In some embodiments, indicator 257 is a light emitting diode (LED). In some embodiments, a color, blinking pattern, and/or brightness of indicator 257 may change indicative of a state of validation wafer 254. For example, in a first state, indicator 257 may have a first brightness, blinking pattern, and/or color to indicate that validation wafer 254 is turned on. In a second state, indicator 257 may have a second brightness, blinking pattern, and/or color to indicate that validation wafer 254 is in a low power state. In a third state, indicator 257 may have a third brightness, blinking pattern, and/or color to indicate to the user that validation wafer 254 is in an external power state (e.g., validation wafer 254 is being charged). In a fourth state, indicator 257 may have a fourth brightness, blinking pattern, and/or color to indicate an error (e.g., an error in transmitting or receiving data, an error in operating sensors, an error in processing data, etc.). In some embodiments, indicator 257 may include multiple LEDs. Further, in some embodiments, indicator 257 may include a graphical user interface (GUI). In some embodiments, switch 255 may be included in a GUI of validation wafer 254.

Referring to FIG. 2D, in some embodiments, charging assembly 225 is located at least partially above, below, and/or within enclosure lid 230 of enclosure system 200. In some embodiments, a non-charging enclosure lid can be removed from an enclosure system 200 and an enclosure lid 230 including charging assembly 225 can be attached to an enclosure system 200.

Charging assembly 225 includes charging coil 227, battery 231, controller 233, and/or switch 235 (e.g., an on/off switch). In some embodiments, battery 231, controller 233, and/or associated electronics (e.g., a printed circuit board (PCB), electronic connections, etc.) are housed substantially within a housing of charging assembly 225. In some embodiments, charging coil 227 is disposed above a charging interface 256 of validation wafer 254. Charging coil 227 may receive electricity from battery 231. In some embodiments, charging coil 227 receives electricity from battery 231 by way of controller 233. In some embodiments, switch 235 is an on/off switch (e.g., an on/off switch of charging assembly 225).

Figure 3:
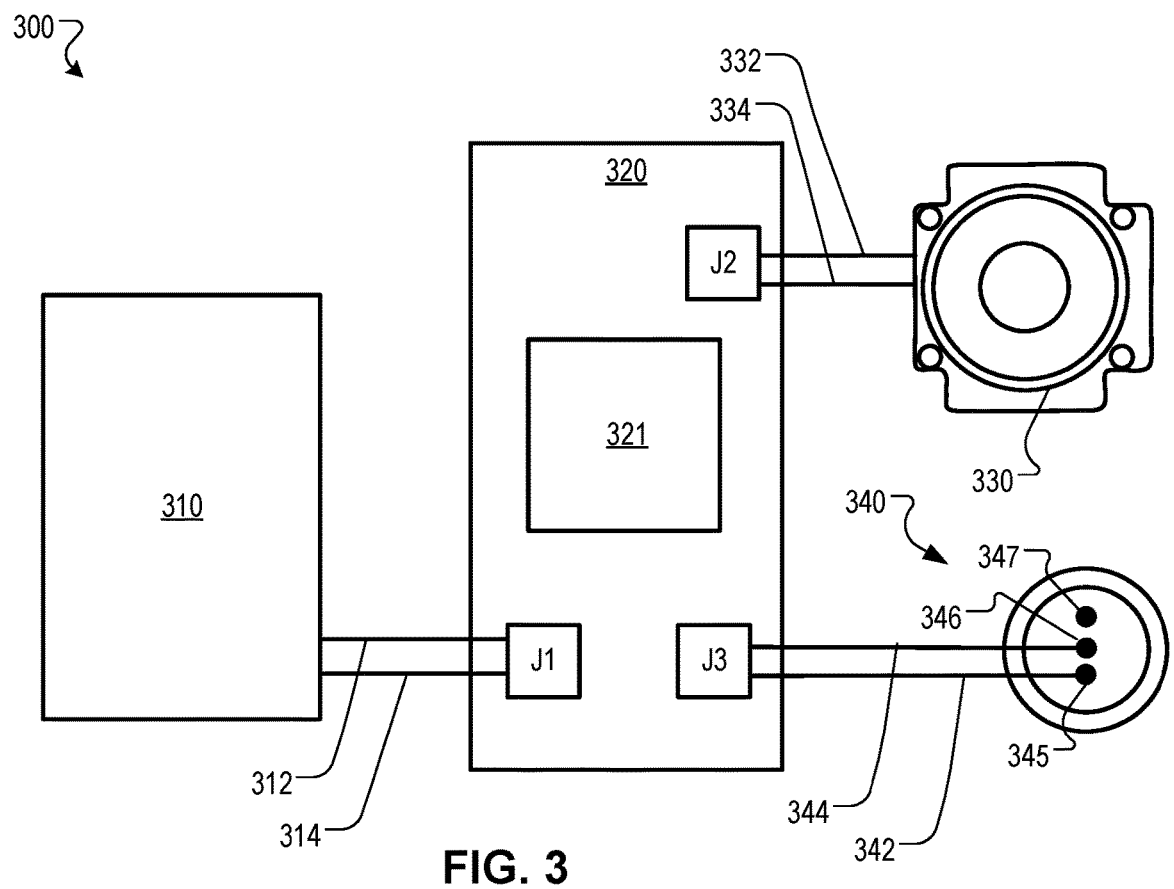
FIG. 3 illustrates a schematic diagram of a charging assembly of an enclosure system, according to certain embodiments.

FIG. 3 illustrates a schematic diagram of a charging assembly 300 (e.g., charging assembly 225 of FIGS. 2A-D) of an enclosure system, according to certain embodiments. Charging assembly 300 may be a charging assembly of an enclosure system (e.g., enclosure system 130 of FIGS. 1A-B, enclosure system 200 of FIGS. 2A-D, etc.). In some embodiments, charging assembly 300 may be a charging assembly of a side storage pod (e.g., SSP of FIG. 1A). Charging assembly 300 may be configured to provide electrical energy to a validation wafer (e.g., validation wafer 254 of FIGS. 2A-D).

In some embodiments, charging assembly 300 includes a battery 310 (e.g., battery 231 of FIG. 2D), a controller 320 (e.g., controller 233 of FIG. 2D), a charging coil 330 (e.g., charging coil 227 of FIGS. 2A, 2B, and 2D), and a switch 340 (e.g., switch 235 of FIG. 2D). In some embodiments, one or more components of charging assembly 300 are included on or are coupled to a PCB. In some embodiments, charging assembly 300 includes one or more PCBs. Battery 310 may store electrical energy used to charge a validation wafer. In some embodiments, battery 310 is a rechargeable battery. Battery 310 may receive electrical energy from an external source (e.g., a wall plug of a substrate manufacturing facility, an electrical connection of an EFEM, etc.). Battery 310 may include one or more sensors to monitor a state of battery 310 (e.g., a charge state, a temperature state, etc.). In some embodiments, battery 310 is a lithium-ion battery. In some embodiments, battery 310 may have a capacity of up to approximately 10,000 milliamp hours. In some embodiments, battery 310 is configured such that battery 310 can be shipped via air travel (e.g., battery 310 meets certain specifications such as size, weight, capacity, etc. to be eligible for air travel).

In some embodiments, battery 310 is electrically connected to charging coil 330 via one or more electrical connections. In some embodiments, battery 310 is electrically coupled to controller 320 and charging coil 330 is also electrically coupled to controller 320. In some embodiments, battery 310 is electrically coupled to controller 320 by battery ground wire 312 and battery hot wire 314. Battery hot wire 314 may connect battery 310 to a first pin of a connector J1 coupled to (e.g., disposed on a PCB of) controller 320. Battery ground wire 312 may connect battery 310 to a second pin of the connector J1. In some embodiments, battery hot wire 314 and/or battery ground wire 312 are a 26 gauge wire.

In some embodiments, charging coil 330 is electrically coupled to controller 320 by charging coil hot wire 334 and charging coil ground wire 332. Charging coil hot wire 334 may connect to a first pin of a connector J2 coupled to (e.g., disposed on PCB of) controller 320. Charging coil ground wire 332 may connect to a second pin of the connector J2. In some embodiments, charging coil hot wire 334 carries an electrical current with a voltage of approximately 3-10 volts, responsive to controller 320 causing a validation wafer to be charged via charging coil 330. In some embodiments, charging coil hot wire 334 carries an electrical current with a voltage of approximately 5 volts responsive to controller 320 causing a validation wafer to be charged via charging coil 330. In some embodiments, charging coil hot wire 334 and/or charging coil ground wire 332 are a 24 gauge wire.

In some embodiments, switch 340 is electrically coupled to controller 320 by switch hot wire 344 and switch ground wire 342. Switch hot wire 344 may connect to a first pin of a connector J3 coupled to (e.g., disposed on a PCB of) controller 320. Switch ground wire 342 may connect to a second pin of the connector J3. Additionally, switch 340 may include multiple pins. In some embodiments, a first pin 345 of switch 340 is electrically coupled to switch ground wire 342. A second pin 346 of switch 340 is electrically coupled to switch hot wire 344. A third pin 347 of switch 340 may be left disconnected. In some embodiments, switch 340 controls a state of controller 320. For example, switch 340 may control an on/off state of controller 320. In a first position, the third pin 347 of switch 340 is electrically coupled to the first pin 345, electrically grounding the third pin 347. In a second position, the second pin 346 of switch 340 is electrically coupled to the first pin 345, electrically grounding the second pin 346. Controller 320 may turn on and/or off based on the position of switch 340. Controller 320 may turn on and/or off based on whether the first pin of connector J3 is electrically grounded (e.g., whether switch hot wire 344 is electrically coupled to switch ground wire 342 via the first pin 345 and the second pin 346 of switch 340). In some embodiments, switch 340 is a push-button switch. In some embodiments, switch 340 is a single-pole double-throw switch (e.g., a switch that only has a single input and can connect to and switch between the 2 outputs). In some embodiments, switch 340 is a toggle switch (e.g., an electrical switch that is actuated by moving a lever back and forth to open or close the electrical circuit). In some embodiments, switch 340 is wirelessly controlled.

In some embodiments, enclosure system (e.g., that includes charging system 300) has one or more sensors. In some embodiments, charging system 300 has one or more sensors. In some embodiments, controller 320 may receive sensor data from battery 310, sensors of enclosure system, sensors of charging system 300, and/or from a validation wafer. In some embodiments, controller 320 includes a microcontroller 321 (e.g., a processing device, a processor, a computing device, etc.). The sensor data may be indicative of one or more parameters (e.g., charge level of battery 310, age of battery 310, total charging cycles of battery 310, etc.). Microcontroller 321 may determine a state of battery 310, enclosure system, a component of the substrate processing system, and/or of a validation wafer based on sensor data received. For example, microcontroller 321 may determine that battery 310 is in a state of low charge based on sensor data received from one or more battery sensors. In another example, microcontroller 321 may determine that the validation wafer is in a state of low charge based on sensor data received from the validation wafer. In some embodiments, the microcontroller 321 determines a state of one or more components (e.g., process kit ring, processing chamber, etc.) based on sensor data received from the validation wafer. In some embodiments, microcontroller 321 causes a corrective action based on the determined state. For example, microcontroller 321 may cause the validation wafer to be charged (e.g., via charging coil 330). In another example, microcontroller 321 may cause a charging of the validation wafer to be stopped based on its determination (e.g., that the validation wafer is fully charged, that the electrical storage device of the validation wafer is overheated, etc.). In some embodiments, controller 320 (e.g., microcontroller 321) causes the validation wafer to be charged responsive to the validation wafer being within a threshold distance of the charging coil 330. In some embodiments, controller 320 causes the validation wafer to be charged responsive to the charging interface of the validation wafer being aligned with the charging coil 330. Controller 320 may cause a flow of electricity from battery 310 to charging coil 330 to start and/or stop. In some embodiments, controller 320 regulates a charge of the validation wafer so as not to under charge and/or over charge the validation wafer. In some embodiments, controller 320 provides an alert based on the sensor data. In some embodiments, the controller 320 causes the enclosure system to be docked (e.g., on the load port) for a threshold amount of time to charge the battery 310 to a threshold charge level.

In some embodiments, charging coil 330 is configured to electrically charge a validation wafer by inductive charging. Charging coil 330 may energize responsive to electricity being provided by controller 320 (e.g., via charging coil hot wire 334). Charging coil 330 may wirelessly charge a validation wafer. In some embodiments, charging coil 330 may wirelessly charge a validation wafer using resonant inductive coupling. Charging coil 330 may wirelessly charge a validation wafer by using electromagnetic induction between planar coils (e.g., between charging coil 330 and a corresponding coil of the validation wafer). In some embodiments, charging coil 330 may generate an oscillating magnetic field. The oscillating magnetic field may induce an alternating current in a receiving coil (e.g., a coil of a validation wafer) by Faraday's law of induction. In some embodiments, charging coil 330 uses a Qi standard to wirelessly charge a validation wafer. In use, charging coil 330 may be coupled to a bottom surface of an upper wall of an enclosure system.

Figure 4:
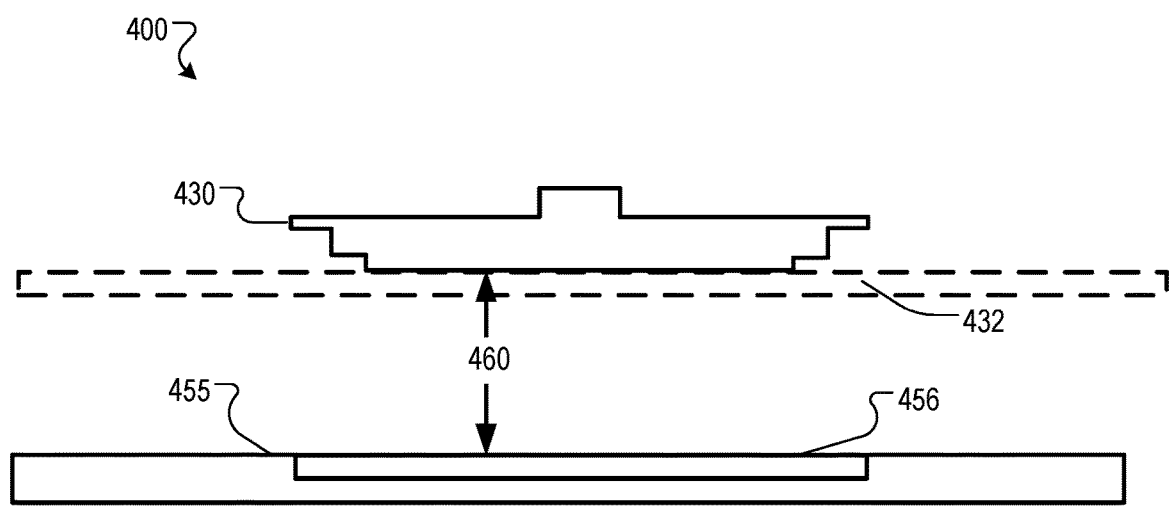
FIG. 4 illustrates a side view of a charging assembly of an enclosure system, according to certain embodiments.

FIG. 4 illustrates a side view of a charging assembly 400 (e.g., charging assembly 225 of FIGS. 2A-D, charging assembly 300 of FIG. 3) of an enclosure system, according to certain embodiments. In some embodiments, charging assembly 400 is a charging assembly of a side storage pod (e.g., SSP of FIG. 1A). In some embodiments, a validation wafer is supported by one or more support structures within a threshold distance 460 of charging coil 430. A top surface of the validation wafer (e.g., wafer top surface 455) may be within the threshold distance 460 from a surface of charging coil 430. Charging coil 430 may be coupled to a charging coil support 432 an enclosure system (e.g., enclosure system 130 of FIGS. 1A-B, enclosure system 200 of FIGS. 2A-D). Charging coil support 432 may be coupled to a lower surface of a lid of an enclosure system. In some embodiments, charging coil support 432 may be coupled to an enclosure system (e.g., enclosure system 200 of FIG. 2B) between on or more support structures (e.g., support structures 244A-F of FIG. 2B). For charging of the validation to commence, in some embodiments, charging interface 456 is aligned with charging coil 430. Charging interface 456 may be within the threshold distance 460 of charging coil 430. In some embodiments, the threshold distance 460 is approximately 6 to 8 millimeters (mm). In some embodiments, wafer top surface 455 is disposed 5 to 6 mm below charging coil support 432. Charging coil support 432 may be approximately 0.5 mm thick. In some embodiments, charging coil support 432 is a bottom wall of charging assembly 400. In some embodiments, a lower surface of charging coil support 432 is disposed approximately 5 to 6 millimeters above wafer top surface 455. In some embodiments, wafer top surface 455 is disposed a threshold distance below a bottom surface of charging coil support 432 to facilitate a robot arm lifting the validation wafer from a support structure to extract the validation wafer from the enclosure system without the wafer top surface 455 contacting the lower surface of charging coil support 432.

Figure 5:
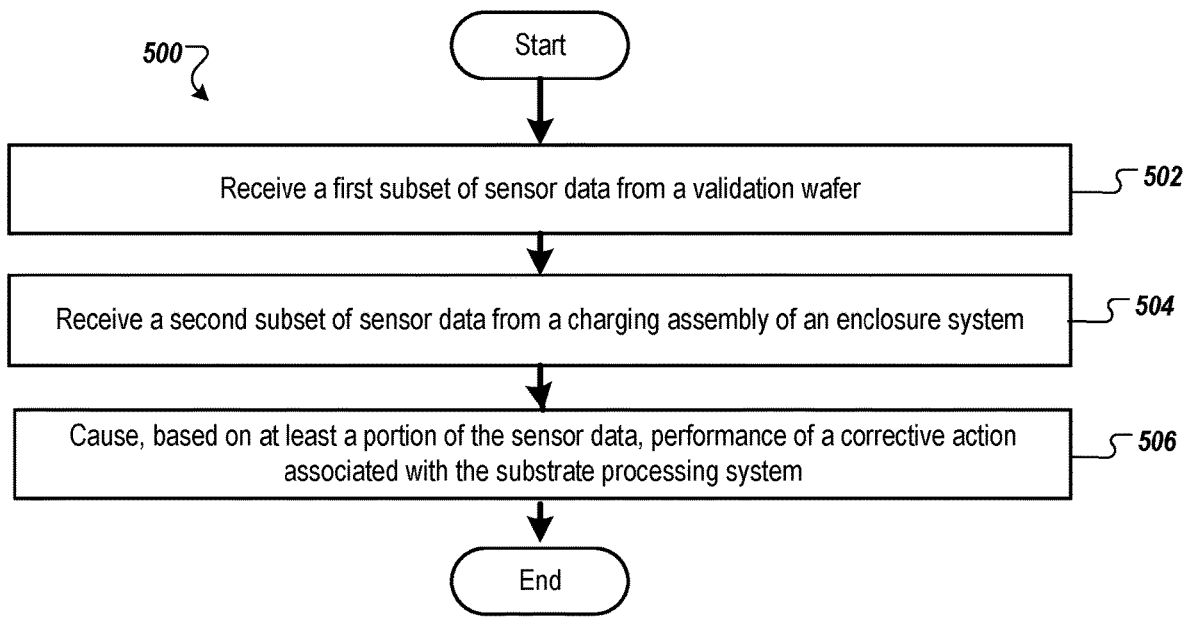
FIG. 5 illustrates a flow diagram of a method of causing performance of a corrective action, according to certain embodiments.

FIG. 5 illustrates a flow diagram of a method 500 of causing performance of a corrective action (e.g., associated with an enclosure system, associated with a substrate processing system, associated with a validation wafer, etc.), according to certain embodiments. In some embodiments, one or more operations of method 500 are performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 500 may be performed, at least in part, by predictive system 110 of FIG. 1B. In some embodiments, method 500 may be performed, at least in part by corrective action component 123. In some embodiments, method 500 may be performed, at least in part by a controller (e.g., controller 320 of FIG. 3) of an enclosure system. In some embodiments, method 500 may be performed, at least in part by a processing device of a validation wafer. In some embodiments, method 500 may be performed, at least in part by a controller of a substrate processing system (e.g., controller 109 of processing system 100A of FIG. 1A). In some embodiments, method 500 may be performed, at least in part by a controller of a substrate processing facility (e.g., that controls movement of enclosure systems to different substrate processing systems). In some embodiments, method 500 may be performed, at least in part by a controller of an EFEM. Although shown in a particular sequence or order, unless otherwise specified, the order of the processes may be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In some embodiments, a non-transitory storage medium stores instructions that when executed by a processing device (e.g., of predictive system 110, of server machine 180, of predictive server 112, manufacturing equipment 124, validation wafer 128, enclosure system 130, client device 120, controller 109, etc.) cause the processing device to perform method 500.

For simplicity of explanation, method 500 is depicted and described as a series of operations. However, operations in accordance with this disclosure can occur in various orders and/or concurrently and with other operations not presented and described herein. Furthermore, not all illustrated operations may be performed to implement method 500 in accordance with the disclosed subject matter. In addition, those skilled in the art will understand and appreciate that method 500 could alternatively be represented as a series of interrelated states via a state diagram or events.

At block 502, processing logic (e.g., of enclosure system, of substrate processing system, of substrate processing facility, of EFEM, etc.) receives a first subset of sensor data from a validation wafer. In some embodiments, the processing logic receives the first subset via wireless communication.

In some embodiments, the first subset is associated with at least a charge state of an electrical storage device (e.g., battery, super-capacitor, etc.) of the validation wafer. In some embodiments, the validation wafer is configured to be transferred by a robot of an EFEM of a substrate processing system from one or more support structures (e.g., a pair of shelves, a U-shaped shelf) disposed in an interior volume formed by an enclosure system.

In some embodiments, the first subset may include battery data associated with a charge state of a super-capacitor of the validation wafer (e.g., a charge level of the super-capacitor). In some embodiments, the first subset may include temperature data. For example, the first subset may include temperature data of an electrical storage device (e.g., a super-capacitor) of the validation wafer. In an additional example, the first subset may be associated with a sharpness score of one or more images captured by an imaging device (e.g., camera) of the validation wafer. A sharpness score may be a metric of how many 'crisp' edges there are in an image. For example, a higher sharpness score indicates the presence of more edges. A sharpness score may be unit-less. In some embodiments, the first subset may be indicative of an amount of electricity needed to fully charge a validation wafer. In some embodiments, the processing device receives the first subset from a second validation wafer.

In some embodiments, the first subset includes image data. The image data may be image data associated with a process kit ring disposed within a processing chamber associated with the enclosure system. For example, the image data may be associated with placement and/or a condition of a process kit ring in a processing chamber. The image data may be associated with corrosion and/or erosion of the process kit ring exposed to one or more plasma processes over time inside the processing chamber.

The first subset may include one or more of alignment data (e.g., of a process kit ring disposed in a processing chamber), image data (e.g., one or more captured images), light beam data (e.g., laser light beam data), vibration data, temperature data, humidity data, process gas data, particle data, pressure data, proximity data, displacement data, impedance data, acoustic data, placement data, etc.

At block 504, processing logic receives a second subset of the sensor data from a charging assembly (e.g., controller of charging assembly) of an enclosure system. In some embodiments, the processing device receives the second subset via wireless communication. In some embodiments, the second subset includes battery data (e.g., charge data, temperature data, cycle data, age data, etc.) associated with a battery of the charging assembly. As an example, the second subset may include data associated with a charge level (e.g., charge state) of the charging assembly battery. In some embodiments, the second subset may be associated with a level of charge stored in the battery. In a further example, the second subset may include temperature data associated with the battery (e.g., used to determine whether the battery is overheating). In some embodiments, one or more sensors (e.g., imaging sensors, etc.) of the enclosure system provide the second subset of the sensor data associated with an inventory of the enclosure system. The inventory of the enclosure system may include a quantity and/or location of one or more objects (e.g., validation wafers, process kit rings, etc.) disposed on one or more support structures of the enclosure system.

In some embodiments, the second subset includes identifier data received from an RF ID tag of the enclosure system (e.g., RFID 221 of FIG. 2A). For example, identifier data may include inventory data of the enclosure system. Identifier data may include data associated with a type of the enclosure system. In some embodiments, identifier data may include data associated with a configuration of the enclosure system.

At block 506, processing logic causes performance of a corrective action associated with the substrate processing system. In some embodiments, the causing of the performance of the corrective action is based on the first sensor data. In some embodiments, the causing of the performance of the corrective action is based on the first subset of the first sensor data and/or the second subset of the first sensor data. In some embodiments, the corrective action includes one or more of providing a notification (e.g., a notification on a GUI associated with the enclosure system for viewing by a user), causing the validation wafer to be transferred to the enclosure system to be charged, causing maintenance or replacement of the validation wafer (e.g., maintenance to a component of the validation wafer (e.g., a camera, a sensor, etc.), replacement of a component of the validation wafer, replacement of the validation wafer), and/or causing a process kit ring disposed in a processing chamber to be replaced. In some embodiments, the corrective action includes causing the enclosure system to be located in a charging position for a threshold amount of time to at least partially charge a battery of the enclosure system (e.g., a battery of a charging assembly of the enclosure system), causing maintenance or replacement of a portion of the enclosure system (e.g., causing a battery of the charging assembly of the enclosure system to be repaired and/or replaced, etc.), and/or causing the enclosure system to be transported to a predetermined location. In some embodiments, the predetermined location is a load port (e.g., location adjacent to an EFEM). In some embodiments, the predetermined location is a maintenance location. In some embodiments, the predetermined location is a charging location. In some embodiments, the corrective action includes causing the enclosure system to be charged via an electrical connection between the enclosure system and a load port (e.g., of an EFEM). In some embodiments, the corrective action is associated with a second validation wafer of the enclosure system.

In some embodiments, the processing logic determines performance data or predictive data based on the sensor data, determines a corrective action based on the performance data or predictive data, and causes performance of the corrective action. For example, the processing logic may determine that a charge level of a super-capacitor of a validation wafer falls below a predetermined threshold based on sensor data received from the validation wafer. The processing logic may then determine that the validation wafer is to be charged (i.e., the super-capacitor of the validation wafer is to be charged). Subsequently, the processing logic may cause the validation wafer to be charged (e.g., by a charging assembly of an enclosure system). The processing logic may cause a notification to be provided indicative of the validation wafer needing to be charged.

In another example, the processing logic may determine that a process kit ring disposed inside a processing chamber of a substrate processing system is worn based on image data from the validation wafer. The processing logic may then determine that the process kit ring is to be replaced and/or the process kit ring is to be replaced in the future. Subsequently, the processing logic may cause the process kit ring to be replaced. The processing logic may cause a notification to be provided indicative of the process kit ring needing to be replaced.

In a further example, the processing logic may determine that a charge of a battery of an enclosure system charging assembly is below a predetermined threshold. The processing logic may then determine that the battery is to be charged. Subsequently, the processing logic may cause the battery to be charged (e.g., via an electrical connection between the enclosure system and an EFEM, via an electrical connection between the enclosure system and the substrate processing facility, etc.). The processing logic may cause a notification to be provided indicative of the battery needing to be charged.

In some embodiments, the processing logic may determine performance data and/or predictive data by implementing one or more machine learning models (e.g., one or more machine learning models described in reference to FIGS. 6A-C below).

Figure 6A:
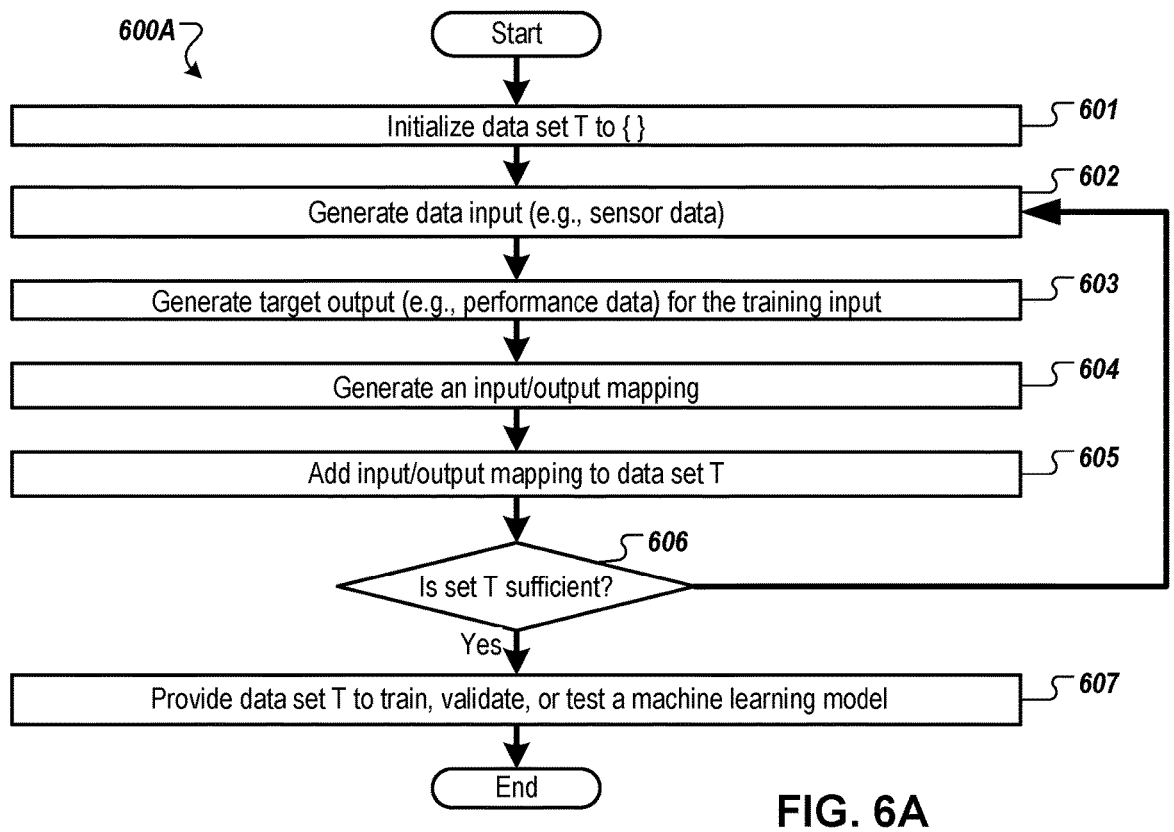
FIGS. 6A-C illustrate flow diagrams of methods associated with machine learning models, according to certain embodiments.
Figure 6B:
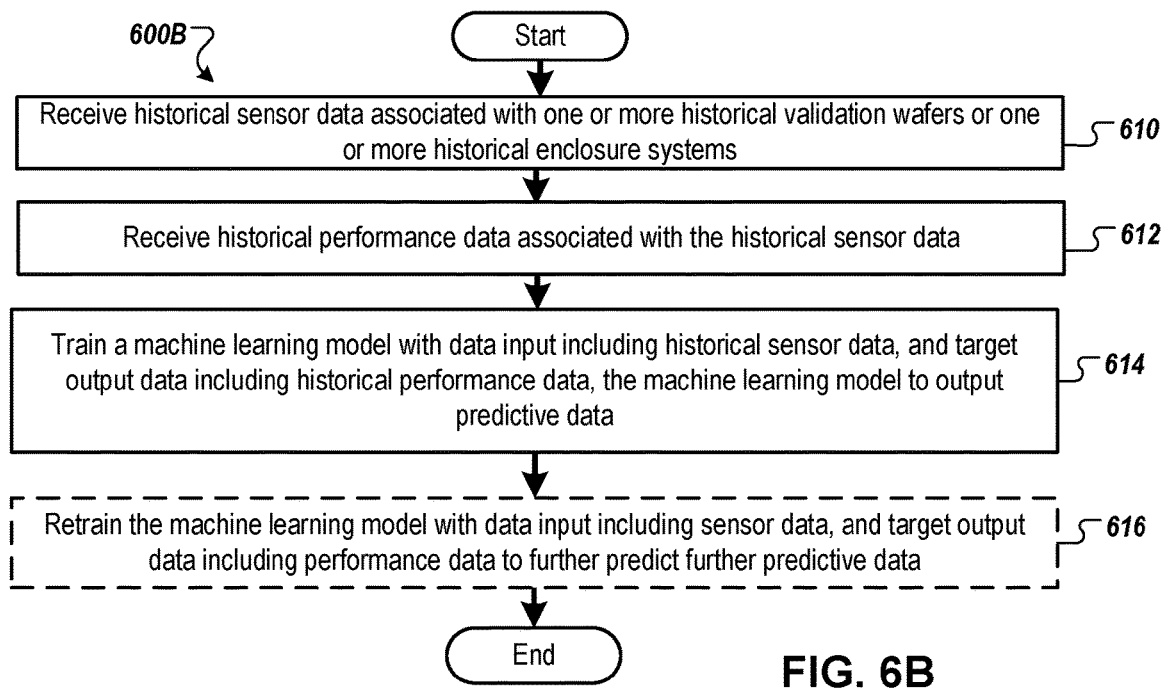
Figure 6C:
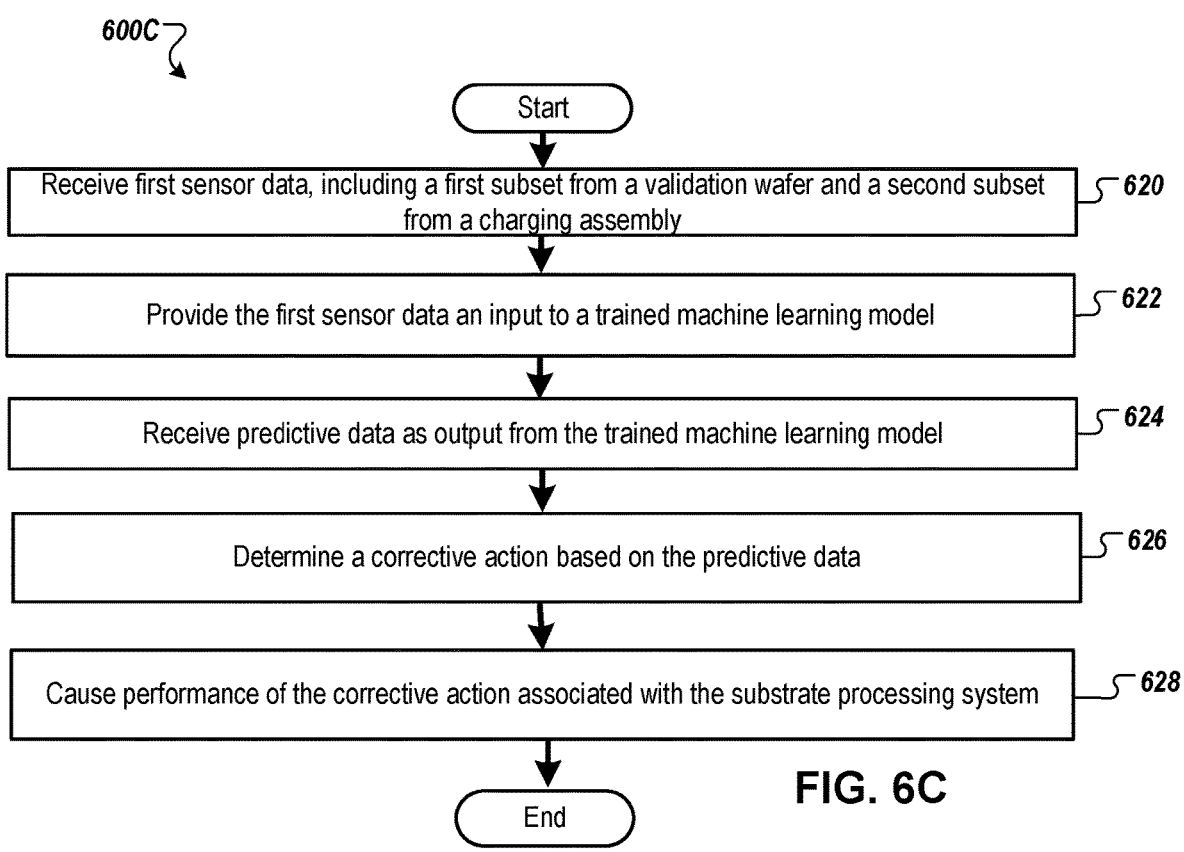

FIGS. 6A-C are flow diagrams of methods 600A-C associated with machine learning models (e.g., to generate predictive data associated with an enclosure system), according to certain embodiments. Methods 600A-C can be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 600A-C may be performed, in part, by predictive system 110. Method 600A can be performed, in part, by predictive system 110 (e.g., server machine 170 and training set generator 172 of FIG. 1). Predictive system 110 may use method 600A to generate a data set to at least one of train, validate, or test a machine learning model, in accordance with embodiments of the disclosure. Method 600B may be performed by server machine 180 (e.g., training engine 182, etc.). Method 600C may be performed by predictive server 112 (e.g., predictive component 114). In some embodiments, a non-transitory storage medium stores instructions that when executed by a processing device (e.g., of predictive system 110, of server machine 180, of predictive server 112, etc.) cause the processing device to perform one or more of methods 600A-C. In some embodiments, the storage medium is a non-transitory machine-readable storage medium storing instructions that when executed by a processing device (e.g., predictive system 110, client device 120, etc.) cause the processing device to perform methods 600A-C.

For simplicity of explanation, methods 600A-C are depicted and described as a series of operations. However, operations in accordance with this disclosure can occur in various orders and/or concurrently and with other operations not presented and described herein. Furthermore, not all illustrated operations may be performed to implement methods 600A-C in accordance with the disclosed subject matter. In addition, those skilled in the art will understand and appreciate that methods 600A-C could alternatively be represented as a series of interrelated states via a state diagram or events.

FIG. 6A is a flow diagram of a method 600A for generating a data set for training a machine learning model (e.g., model 190 of FIG. 1B) to predict performance data associated with an enclosure system, according to certain embodiments.

Referring to FIG. 6A, in some embodiments, at block 601 the processing logic implementing method 600A initializes a training set T to an empty set.

At block 602, processing logic generates first data input (e.g., first training input, first validating input) that may include sensor data (e.g., sensor data 141 of FIG. 1B), etc. In some embodiments, the first data input may include a first set of features for types of data and a second data input may include a second set of features for types of data.

At block 603, processing logic generates a first target output for one or more of the data inputs (e.g., first data input). In some embodiments, the first target output is performance data (e.g., performance data 144 of FIG. 1B).

At block 604, processing logic optionally generates mapping data that is indicative of an input/output mapping. The input/output mapping (or mapping data) may refer to the data input (e.g., one or more of the data inputs described herein), the target output for the data input, and an association between the data input(s) and the target output.

At block 605, processing logic adds the mapping data generated at block 604 to data set T, in some embodiments.

At block 606, processing logic branches based on whether data set T is sufficient for at least one of training, validating, and/or testing machine learning model 190 of FIG. 1B. If so, execution proceeds to block 607, otherwise, execution returns to block 602. It should be noted that in some embodiments, the sufficiency of data set T may be determined based simply on the number of inputs, mapped in some embodiments to outputs, in the data set, while in some other implementations, the sufficiency of data set T may be determined based on one or more other criteria (e.g., a measure of diversity of the data examples, accuracy, etc.) in addition to, or instead of, the number of inputs.

At block 607, processing logic provides data set T (e.g., to server machine 180 of FIG. 1B) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 188 of server machine 180 to perform the testing.

Over many training sets, the machine learning model chooses an appropriate value of a parameter controlling the number of non-zero coefficients in the reduced order model. After block 607, machine learning model (e.g., machine learning model 190) can be at least one of trained using training engine 182 of server machine 180, validated using validating engine 184 of server machine 180, or tested using testing engine 188 of server machine 180. The trained machine learning model may be implemented by predictive component 114 (of predictive server 112) to generate current performance data 146 for performing corrective action associated with the enclosure system 130 and/or the validation wafer 128.

FIG. 6B is a method 600B for training a machine learning model (e.g., model 190 of FIG. 1B) to generate predictive data (e.g., associated with an enclosure system), according to certain embodiments.

Referring to FIG. 6B, at block 610 of method 600B, the processing logic receives historical sensor data. The historical sensor data may be associated with one or more historical validation wafers or one or more historical enclosure systems. In some embodiments, the historical sensor data is associated with an electrical storage device of a historical validation wafer. In some embodiments, historical sensor data (e.g., historical image data) may be associated with one or more historical components (e.g., a historical process kit ring) of a substrate processing system. In some embodiments, the historical sensor data is associated with a component (e.g., a process kit ring) disposed in a processing chamber. The historical sensor data can be retrieved by the processing logic from memory (e.g., data store 140 of FIG. 1B), rather than directly from the validation wafer.

At block 612, the processing logic receives historical performance data associated with the historical sensor data. In some embodiments, the historical performance data may include a corrective action associated with the historical sensor data. For example, the historical performance data may include a charging action of a validation wafer associated with historical sensor data indicative of a charging state of a historical validation wafer. In another example, the historical performance data may include a processing chamber maintenance operation (e.g., a replacement of a process kit ring disposed in the processing chamber) associated with historical sensor data indicative of a condition of a chamber component (e.g., a process kit ring). In some embodiments, historical performance data may include an inaction associated with the historical sensor data. For example, historical performance data may indicate that no corrective action was taken in association with historical sensor data indicative of a charge state of a validation wafer.

At block 614, the processing logic trains a machine learning model (e.g., model 190 of FIG. 1B). The machine learning model is trained with data input including historical sensor data. The machine learning model is trained with target output data including historical performance data. In some embodiments, the historical performance data corresponds to a corrective action to be performed on the processing chamber and/or the validation wafer. The training data input to the machine learning model is mapped to the training target output. The machine learning model is trained to predict predictive data to be used to perform a corrective action. In some embodiments, the machine learning model is trained to output predicted performance data (e.g., data indicative of one or more corrective actions to be performed).

In some embodiments, more than one machine learning model can be parts of a single compound machine learning model. In this case, training one component of this compound model may involve receiving output from another component of the model as training input to the component of the model to be trained.

At block 616, the machine learning model can be retrained, using additional data. The machine learning model can be retrained with data input including the sensor data (e.g., first and/or second subsets of first sensor data). The machine learning model can be retrained with target output data including performance data. The machine learning model can be retrained to further predict predictive data associated with a corrective action to be performed. In some embodiments, the machine learning model can be continually trained to account for drift in the manufacturing equipment, sensors, metrology equipment, validation wafer, etc., or to reflect changes to procedures or recipes, etc.

FIG. 6C is a method 600C for using a trained machine learning model (e.g., model 190 of FIG. 1B) to generate predictive data (e.g., associated with an enclosure system), according to certain embodiments. In some embodiments, the trained machine learning model may be configured to output predictive data (e.g., predicted data associated with a corrective action of an enclosure system).

Referring to FIG. 6C, at block 620 of method 600C, the processing logic receives sensor data. The processing logic may receive a first subset of sensor data from a validation wafer and/or a second subset of sensor data from a charging assembly of an enclosure system. The types of sensor data may correspond to that provided in block 610 of FIG. 6B to train the machine learning model. Block 620 may be similar to block 502 and/or block 504.

At block 622, the processing logic provides the sensor data as input to a trained machine learning model (e.g., model 190 of FIG. 1B). The processing logic may provide one or more of the first subset and/or the second subset as input to the trained machine learning model. The machine learning model can be trained in accordance with embodiments described with respect to FIGS. 6A and 6B. For example, the machine learning model is trained to generate predictive data (e.g., corresponding to one or more corrective actions), as described above.

At block 624, the processing logic obtains one or more outputs of the machine learning model. In some embodiments, the one or more outputs of the machine learning model include predictive data corresponding to one or more corrective actions. In some embodiments, the processing logic determines predictive data based on the one or more outputs of the machine learning model. The predictive data may be a prediction of performance data. For example, the predictive data may be associated with a prediction that a super-capacitor (e.g., of a validation wafer) will be out of charge at a given time or after a given number of cycles (e.g., validation wafer inspection cycles). In another example, the predictive data may be associated with a prediction that a process kit ring (e.g., of a processing chamber) will be worn beyond a predetermined threshold at a given time. In some embodiments, the one or more outputs of the machine learning model indicate one or more corrective actions to be performed on the processing chamber and/or on the validation wafer.

At block 626, the processing logic determines a corrective action to be performed based on the predictive data. In some embodiments, the processing logic causes a corrective action associated with the predictive data to be performed. In an example, the processing logic may determine that the super-capacitor of the validation wafer is to be charged at or before the given time or at or before the given number of cycles. In another example, the processing logic may determine that the validation wafer is to be docked longer (e.g., in an enclosure system) to receive a charge from an enclosure system charging assembly. In another example, the processing logic may determine that a process kit ring is to be replaced based on predicted data (e.g., as in the example above).

At block 628, the processing logic causes the corrective action associated with the substrate processing system. Block 628 may be similar to block 506 of FIG. 5. For example, the processing logic may cause the super-capacitor of the validation wafer to be charged. In another example, the processing logic may cause the validation wafer to be docked longer to receive more charge from the enclosure system charging assembly. In another example, the processing logic may cause the replacement of a process kit ring in a processing chamber.

Figure 7:
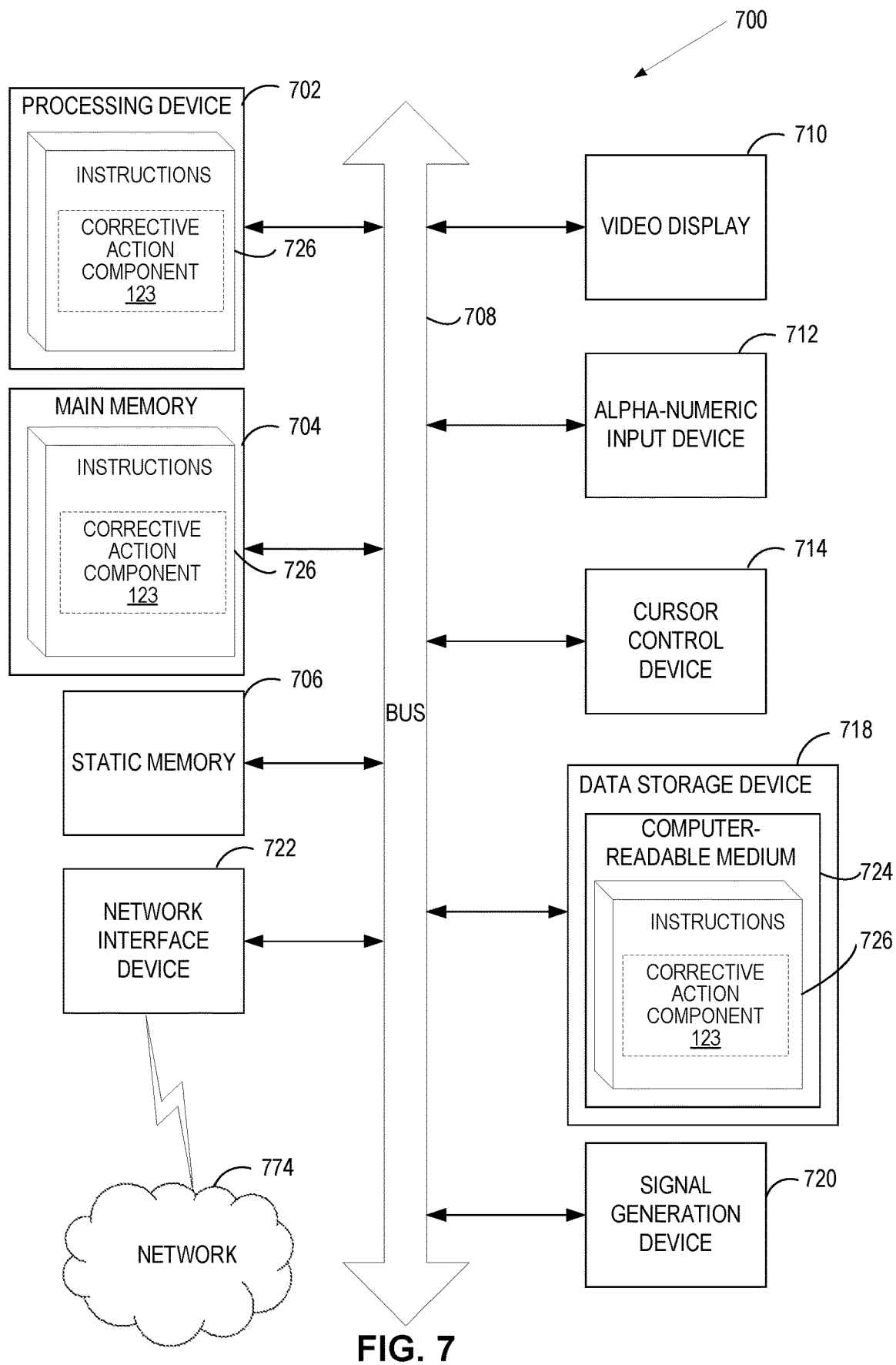
FIG. 7 is a block diagram illustrating a computer system, according to certain embodiments.

FIG. 7 is a block diagram illustrating a computer system 700, according to aspects of the present disclosure. In some embodiments, the computer system 700 is the client device 120 (e.g., of FIG. 1B). In some embodiments, the computer system 700 is a controller 109 (e.g., of FIGS. 1A-B). In some embodiments, the computer system 700 is a processing device of validation wafer 128 (e.g., of FIG. 1B). In some embodiments, the computer system 700 is a processing device of enclosure system 130 (e.g., of FIGS. 1A-B, microcontroller 321 of FIG. 3). Computer system 700 may incorporate cloud-based functionality.

In some embodiments, computer system 700 is connected (e.g., via a network, such as a Local Area Network (LAN), an intranet, an extranet, or the Internet) to other computer systems. Computer system 700 operates in the capacity of a server or a client computer in a client-server environment, or as a peer computer in a peer-to-peer or distributed network environment. In some embodiments, computer system 700 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 700 includes a processing device 702, a volatile memory 704 (e.g., Random Access Memory (RAM)), a non-volatile memory 706 (e.g., Read-Only Memory (ROM) or Electrically-Erasable Programmable ROM (EEPROM)), and/or a data storage device 718, which communicates with each other via a bus 708.

In some embodiments, processing device 702 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor). In some embodiments, processing device 702 is provided by one or more of a single processing device, multiple processing devices, a single processing device having multiple processing cores, and/or the like.

In some embodiments, computer system 700 further includes a network interface device 722 (e.g., coupled to network 774). In some embodiments, the computer system 700 includes one or more input/output (I/O) devices. In some embodiments, computer system 700 also includes a video display unit 710 (e.g., a liquid crystal display (LCD)), an alphanumeric input device 712 (e.g., a keyboard), a cursor control device 714 (e.g., a mouse), and/or a signal generation device 720.

In some implementations, data storage device 718 (e.g., disk drive storage, fixed and/or removable storage devices, fixed disk drive, removable memory card, optical storage, network attached storage (NAS), and/or storage area-network (SAN)) includes a non-transitory computer-readable storage medium 724 on which stores instructions 726 encoding any one or more of the methods or functions described herein, including instructions encoding components of FIG. 1B (e.g., corrective action component 123, etc.) and for implementing methods described herein. In some embodiments, the processing device 702 includes corrective action component 123. In some embodiments, sensor data 141, performance data 144, and/or predictive data 147 is stored in data storage device 718.

In some embodiments, instructions 726 also reside, completely or partially, within volatile memory 704 and/or within processing device 702 during execution thereof by computer system 700, hence, volatile memory 704 and processing device 702 also constitute machine-readable storage media, in some embodiments.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. Further, the methods, components, and features are implemented in any combination of hardware devices and computer program components, or in computer programs.

Unless specifically stated otherwise, terms such as "receiving," "causing," "providing," "training," "determining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or it includes a general purpose computer system selectively programmed by a computer program stored in the computer system. In some embodiments, such a computer program is stored in a computer-readable tangible storage medium.

The methods and illustrative examples described herein are not inherently related to any particular computer or other apparatus. Various general purpose systems can be used in accordance with the teachings described herein, or a more specialized apparatus can be constructed to perform methods described herein and/or each of their individual functions, routines, subroutines, or operations. Examples of the structure for a variety of these systems are set forth in the description above.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method can be altered so that certain operations are performed in an inverse order so that certain operations are performed, at least in part, concurrently with other operations. In another embodiment, instructions or sub-operations of distinct operations are in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
an enclosure configured to couple to an equipment front end module (EFEM) of a substrate processing system;
a charging assembly; and
one or more first support structures within the enclosure and configured to support a first validation wafer in a first charging position to charge the first validation wafer via the charging assembly.

2. The system of claim 1, wherein the one or more first support structures are further configured to position the first validation wafer to align a first charging interface of the first validation wafer with a second charging interface of the charging assembly to charge the first validation wafer via the charging assembly.

3. The system of claim 2, wherein the charging assembly is configured to provide electrical energy to the first charging interface of the first validation wafer responsive to the first validation wafer being disposed within a threshold distance to the second charging interface of the charging assembly.

4. The system of claim 2, wherein the charging assembly further comprises a rechargeable battery coupled to the enclosure and configured to charge the first validation wafer via the second charging interface, and wherein the rechargeable battery is configured to be recharged while coupled to the enclosure.

5. The system of claim 4, wherein the charging assembly further comprises a processor, wherein the processor is configured to receive battery data associated with a charge state of the rechargeable battery and cause a corrective action associated with the battery data.

6. The system of claim 2, wherein the second charging interface is coupled to a lower surface of an upper wall of the enclosure.

7. The system of claim 1, wherein:
the charging assembly further comprises a third charging interface disposed beneath the one or more first support structures; and
the system further comprises one or more second support structures disposed within the enclosure beneath the third charging interface, wherein the one or more second support structures are configured to support a second validation wafer in a second charging position, and wherein the one or more second support structures are further configured to position the second validation wafer to align a fourth charging interface of the second validation wafer with the third charging interface to charge the second validation wafer via the charging assembly.

8. The system of claim 1 further comprising one or more second support structures configured to support a process kit ring within the enclosure, wherein the one or more second support structures are disposed below the one or more first support structures.

9. A charging assembly, comprising:
a first charging interface configured to interface with a second charging interface of a first validation wafer supported in a first charging position by one or more first support structures within an enclosure, wherein the first validation wafer is to be positioned by the one or more first support structures to align the second charging interface with the first charging interface; and
a rechargeable battery configured to charge the first validation wafer via the first charging interface, wherein the rechargeable battery is configured to be recharged while coupled to the enclosure.

10. The charging assembly of claim 9, wherein the charging assembly comprises a removable lid of the enclosure, wherein the removable lid is configured to removably attach to sidewalls of the enclosure, and wherein the rechargeable battery and the first charging interface are coupled to the removable lid.

11. The charging assembly of claim 9, wherein the first charging interface is configured to be coupled to a lower surface of an upper wall of the enclosure.

12. The charging assembly of claim 9, wherein the charging assembly is configured to provide electrical energy to the second charging interface of the first validation wafer responsive to the first validation wafer being disposed within a threshold distance to the first charging interface of the charging assembly.

13. The charging assembly of claim 12 further comprising a third charging interface configured to be disposed beneath the one or more first support structures of the enclosure, and wherein the rechargeable battery is further configured to charge a second validation wafer via the third charging interface.

14. The charging assembly of claim 13, wherein the charging assembly is configured to provide electrical energy to a fourth charging interface of the second validation wafer responsive to the second validation wafer being disposed within the threshold distance to the third charging interface of the charging assembly, and wherein the second validation wafer is to be positioned by one or more second support structures to align the fourth charging interface with the third charging interface.

15. The charging assembly of claim 9 further comprising a processor configured to receive battery data associated with a charge state of the rechargeable battery and to cause a corrective action associated with the battery data.

16. A method comprising:
- receiving a first subset of sensor data from a validation wafer;
- receiving a second subset of sensor data from a charging assembly of an enclosure, wherein one or more support structures within the enclosure are configured to support the validation wafer;
- processing the first subset of sensor data and the second subset of sensor data using a trained machine learning model to determine a predicted corrective action; and
- causing performance of the predicted corrective action.

17. The method of claim 16, wherein the predicted corrective action comprises one or more of:
- providing a notification;
- causing the validation wafer to be transferred to the enclosure to be charged;
- causing maintenance or replacement of the validation wafer; or
- causing a process kit ring disposed in a processing chamber to be replaced.

18. The method of claim 16, further comprising:
- training an untrained machine learning model to produce the trained machine learning model, wherein the untrained machine learning model is trained using a training data set comprising historical sensor data and associated historical corrective action data.

19. The method of claim 18, wherein the training data set comprises:
- first training input data comprising a first subset of the historical sensor data associated with at least a historical charge state of an electrical storage device of the validation wafer;
- second training input data comprising a second subset of the historical sensor data associated with at least the charging assembly of the enclosure; and
- training target output data comprising the associated historical corrective action data, wherein the training target output data is mapped to at least one of the first training input data or the second training input data.

20. The method of claim 18, further comprising:
- retraining the trained machine learning model using the first subset of sensor data, the second subset of sensor data, and data associated with the predicted corrective action.

* * * * *